United States Patent
Tateoka et al.

(10) Patent No.: US 7,873,168 B2
(45) Date of Patent: Jan. 18, 2011

(54) SECRET INFORMATION MANAGEMENT APPARATUS AND SECRET INFORMATION MANAGEMENT SYSTEM

(75) Inventors: Masamichi Tateoka, Higashimurayama (JP); Tomonari Tanaka, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 734 days.

(21) Appl. No.: 11/907,680

(22) Filed: Oct. 16, 2007

(65) Prior Publication Data

US 2008/0095375 A1 Apr. 24, 2008

(30) Foreign Application Priority Data

Oct. 18, 2006 (JP) ............................. 2006-284087

(51) Int. Cl.
*H04L 9/08* (2006.01)
*H04L 9/00* (2006.01)
(52) U.S. Cl. ...................................... 380/282; 380/259
(58) Field of Classification Search ................. 380/282, 380/259
See application file for complete search history.

(56) References Cited

U.S. PATENT DOCUMENTS

| | | | | |
|---|---|---|---|---|
| 6,697,947 | B1* | 2/2004 | Matyas et al. ................ | 713/182 |
| 7,016,495 | B2* | 3/2006 | Scheidt et al. ................ | 380/45 |
| 7,136,489 | B1* | 11/2006 | Madhusudhana et al. ... | 380/277 |
| 7,174,460 | B2* | 2/2007 | Horita et al. ................. | 713/176 |
| 7,551,740 | B2* | 6/2009 | Lee et al. ..................... | 380/278 |
| 2003/0081786 | A1* | 5/2003 | Nakano et al. .............. | 380/277 |
| 2005/0080746 | A1* | 4/2005 | Zhu et al. ..................... | 705/59 |
| 2006/0115089 | A1* | 6/2006 | Carter et al. ................. | 380/273 |
| 2007/0189539 | A1* | 8/2007 | Kim et al. .................... | 380/277 |

FOREIGN PATENT DOCUMENTS

| | | |
|---|---|---|
| JP | 6-175905 | 6/1994 |
| JP | 10-198272 | 7/1998 |
| JP | 10-508438 | 8/1998 |
| JP | 11-15373 | 1/1999 |
| JP | 11-65441 | 3/1999 |

(Continued)

OTHER PUBLICATIONS

Decision of Rejection mailed Jan. 26, 2010, from the Japanese Patent Office in corresponding Japanese application No. 2006-284087.

(Continued)

*Primary Examiner*—Techane J Gergiso
(74) *Attorney, Agent, or Firm*—Finnegan, Henderson, Farabow, Garrett & Dunner, L.L.P.

(57) ABSTRACT

In a secret information management system, a secret information management apparatus comprises a secret distribution unit which secretly distributes a data key k using a (k, n) threshold secret sharing scheme and creates n distributed keys B1, B2, ..., Bn in the decryption of data D input from a user terminal, an encryption unit which creates n encrypted distributed keys $E_{P1}(B1), E_{P2}(B2), ..., E_{Pn}(Bn)$ using n distributed manager public keys P1, P2, ..., Pn, and an encrypted data storage unit which stores encrypted data $E_K(D)$, an encrypted data key $E_{Px}(K)$ and the n encrypted distributed keys in association with each other.

6 Claims, 18 Drawing Sheets

FOREIGN PATENT DOCUMENTS

| | | |
|---|---|---|
| JP | 11-317734 | 11/1999 |
| JP | 2000-165373 | 6/2000 |
| JP | 2001-44982 | 2/2001 |
| JP | 2002-111659 | 4/2002 |
| WO | WO 9605673 | 2/1996 |

OTHER PUBLICATIONS

Notification of Reason for Rejection issued by the Japanese Patent Office on Oct. 21, 2008, for Japanese Patent Application No. 2006-284087, and English-language translation thereof.

* cited by examiner

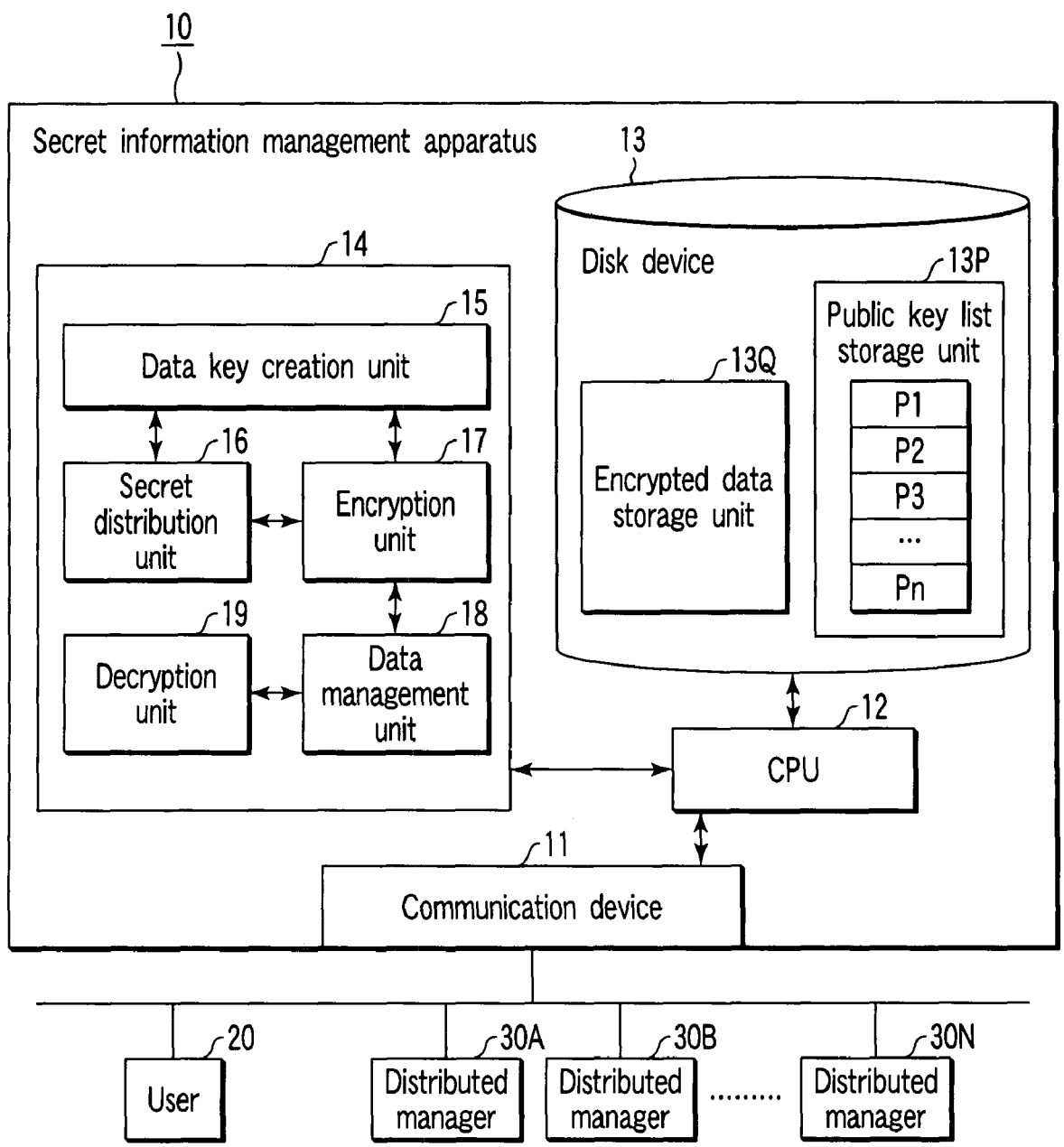
F I G. 1

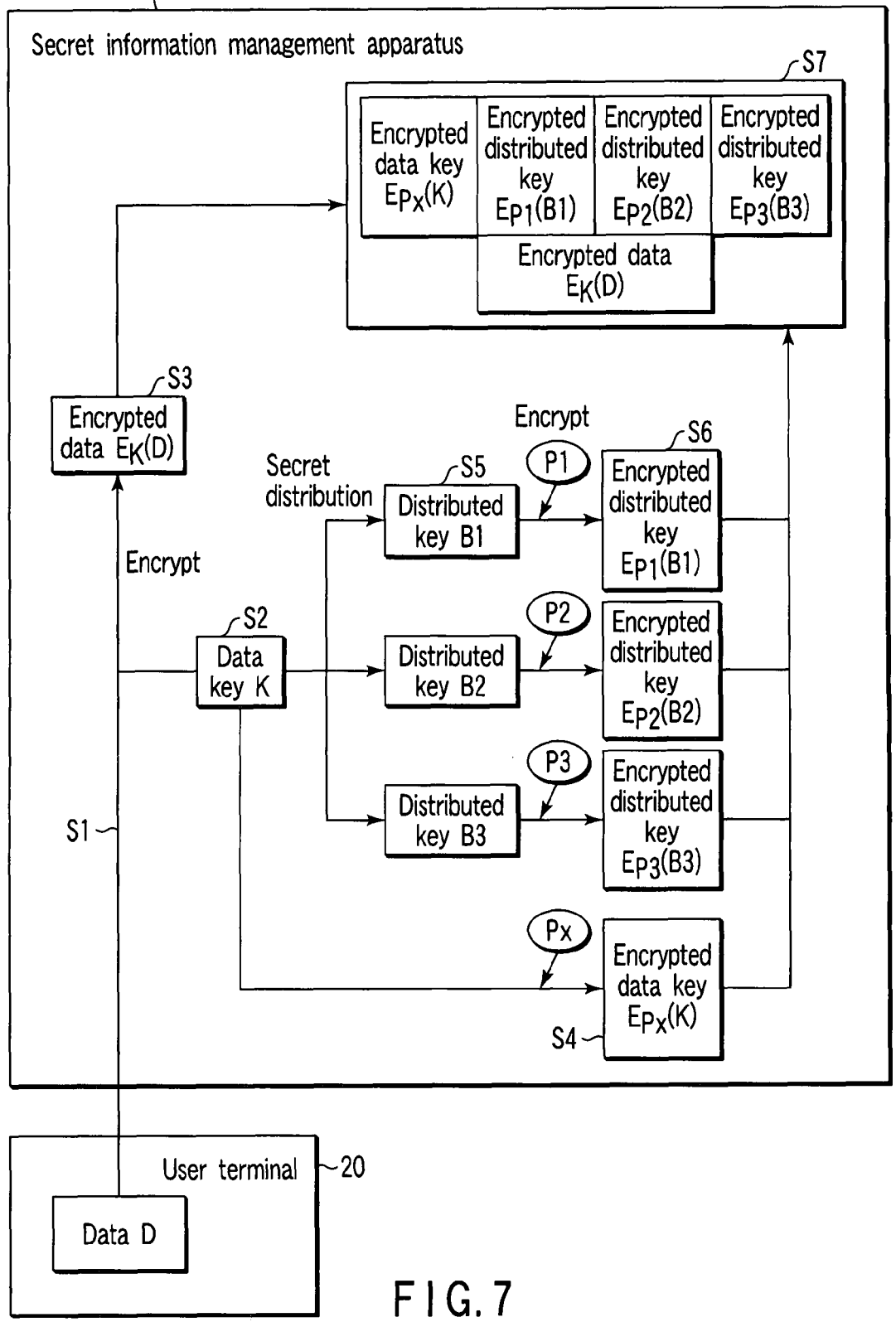
F I G. 7

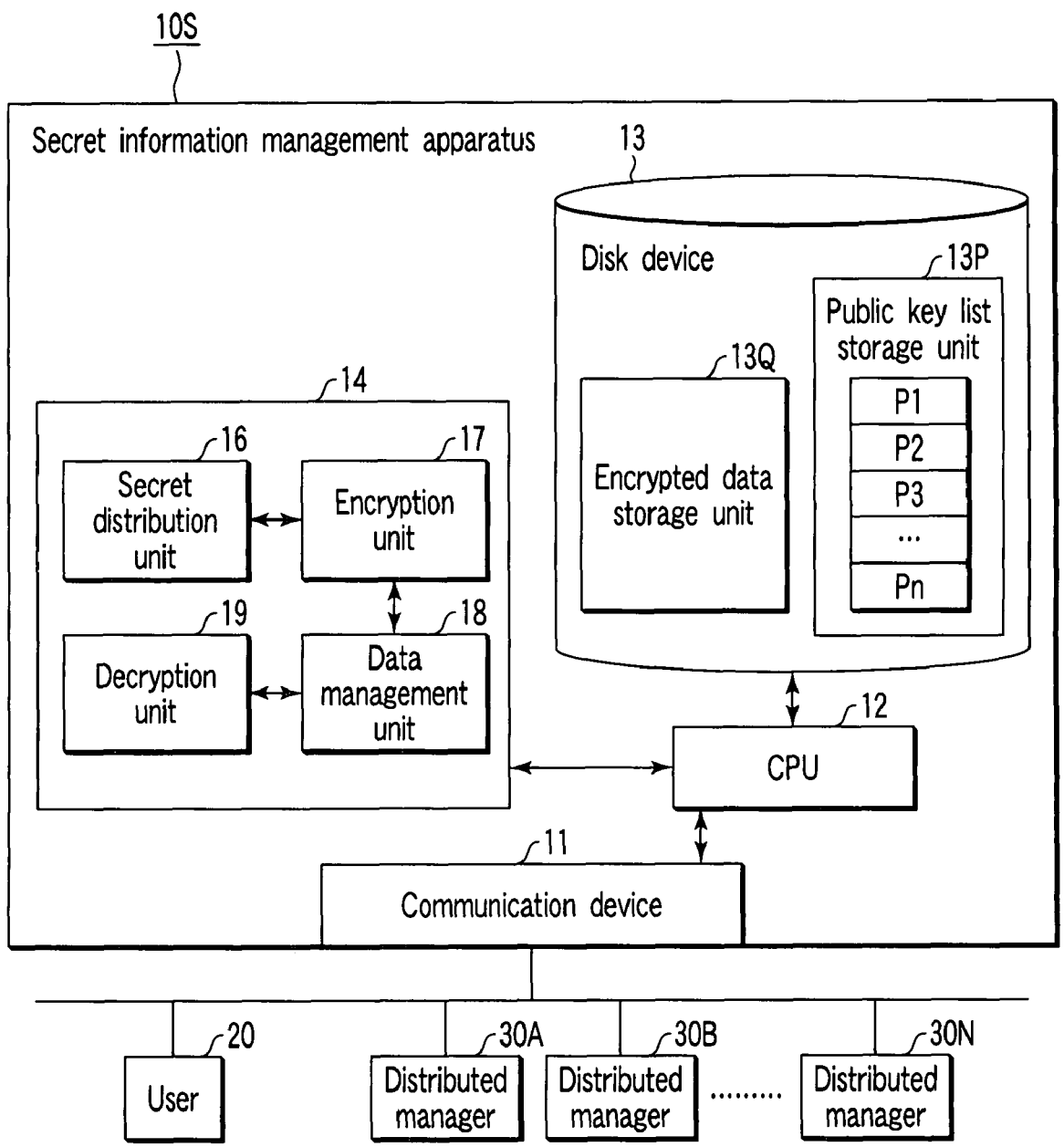
F I G. 12

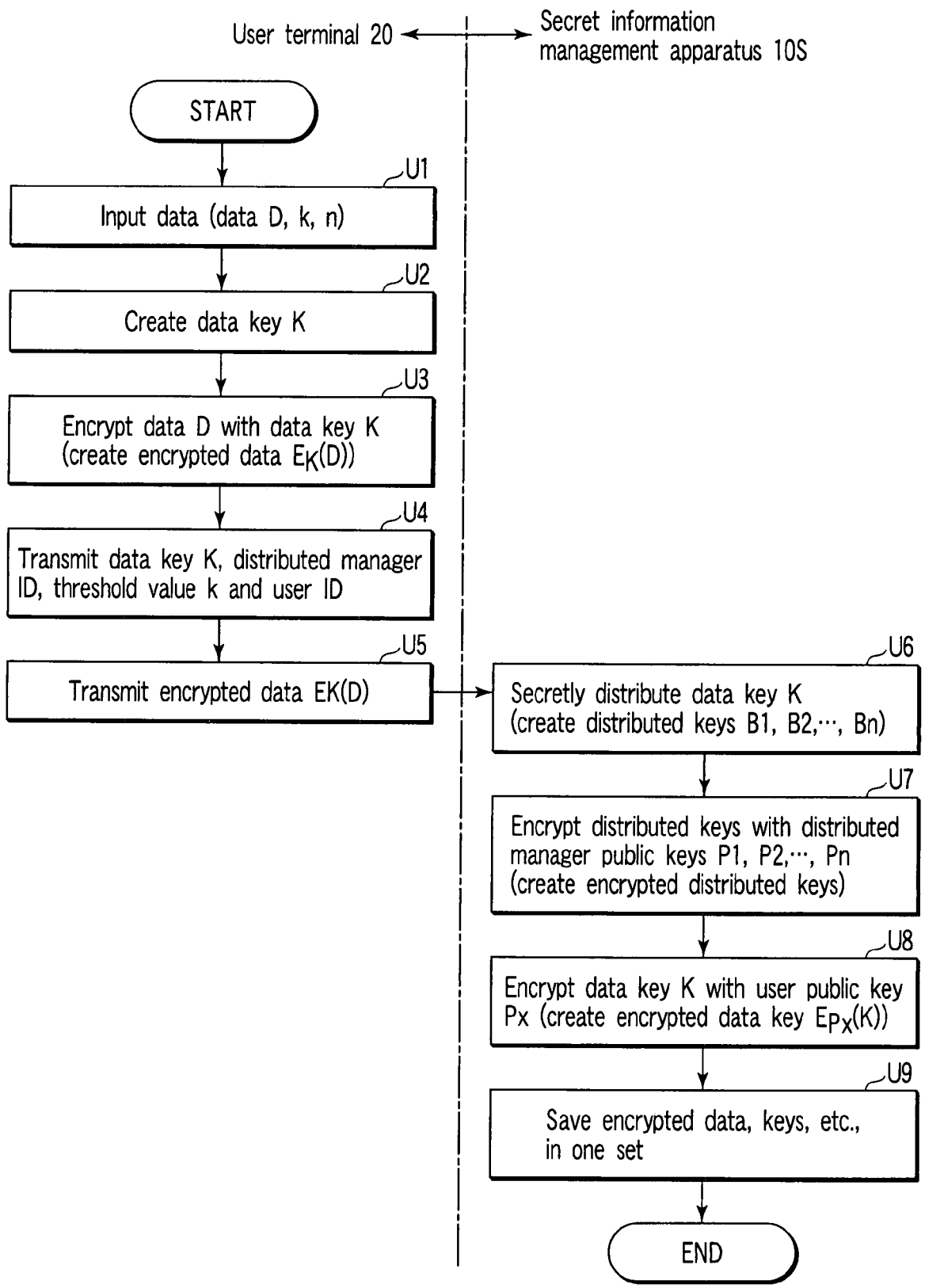
F I G. 13

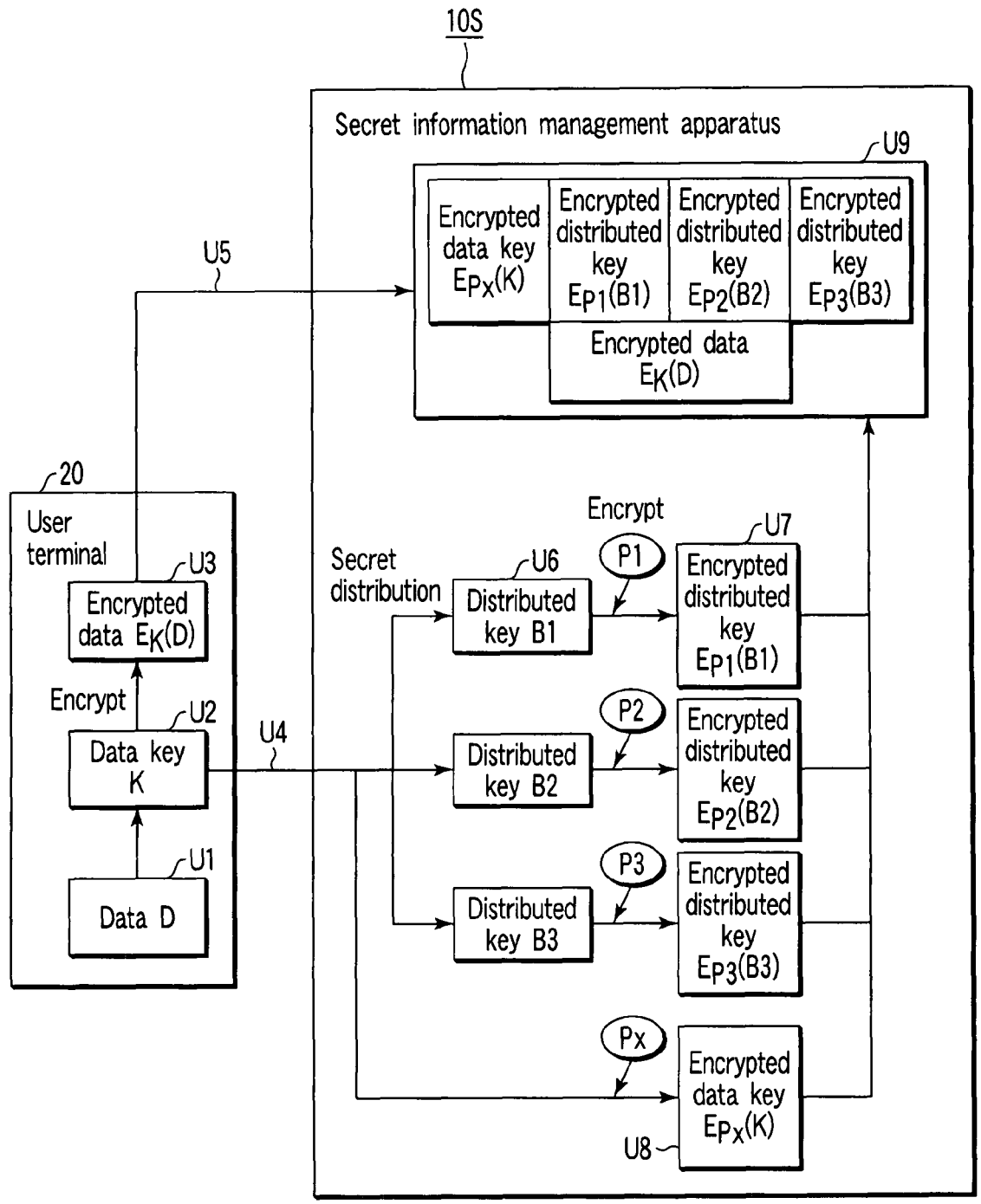
F I G. 14

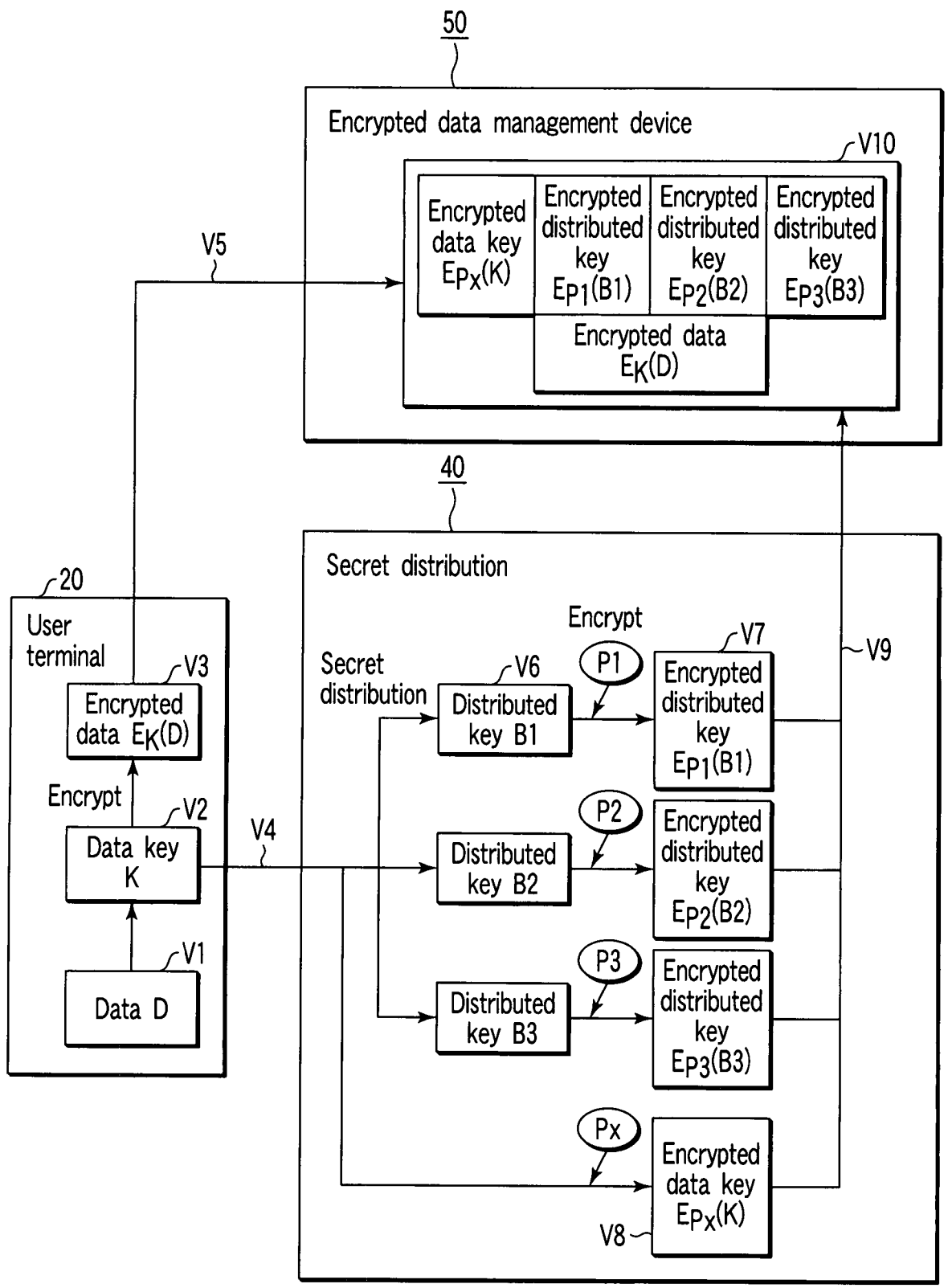
F I G. 17

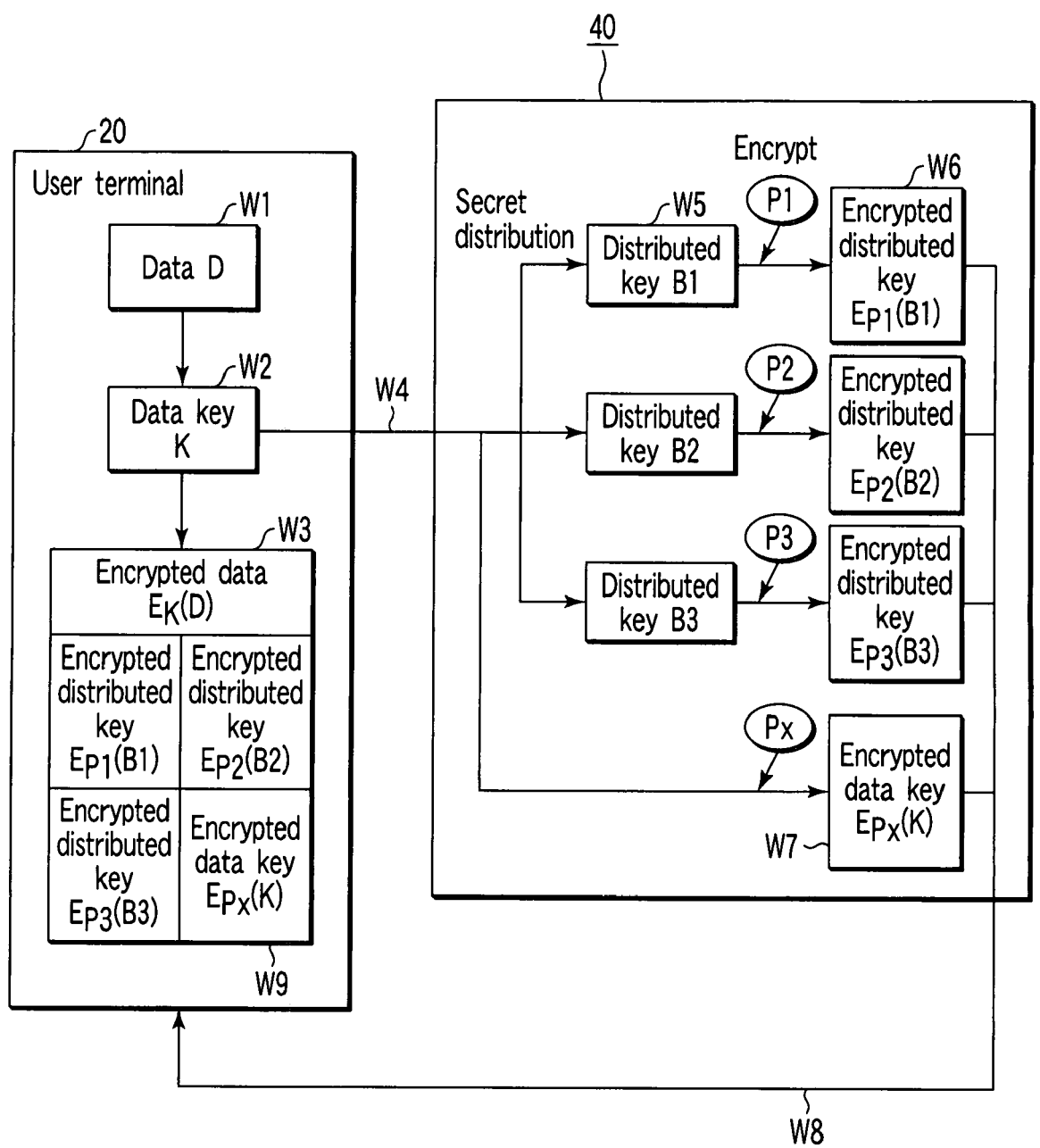
F I G. 20

SECRET INFORMATION MANAGEMENT APPARATUS AND SECRET INFORMATION MANAGEMENT SYSTEM

CROSS-REFERENCE TO RELATED APPLICATIONS

This application is based upon and claims the benefit of priority from prior Japanese Patent Application No. 2006-284087, filed Oct. 18, 2006, the entire contents of which are incorporated herein by reference.

BACKGROUND OF THE INVENTION

1. Field of the Invention

The present invention relates to a secret information management apparatus and secret information management system for encrypting and storing data, and more particularly, it relates to a secret information management apparatus and secret information management system capable of decrypting encrypted data, for example, even when a user has lost an encryption key.

2. Description of the Related Art

Recently, secret information management apparatuses have been used to encrypt and store data to be managed as secret information. For example, in a company, secret information may be better managed by the whole company in a collective manner than by individual users. In such a case, the secret information management apparatus is used.

In the secret information management apparatus, an encryption key is used to encrypt and decrypt secret information (hereinafter also referred to as data). However, when each data are encrypted with different encryption keys, the burden of managing the keys imposed on the user increases in proportion to the number of data.

From the viewpoint of reducing such burden, there has been proposed an encrypted file sharing method in which a hierarchical access is permitted to the user to enable the reduction of an amount of key information managed by the user (e.g., refer to Jpn. Pat. Appln. KOKAI Publication No. 6-175905).

In the method of the above-mentioned document, files (data) are encrypted with the same encryption key for each directory in a server (secret information management apparatus) accessed by a plurality of persons. At this point, a hierarchical structure representing the access permission of the files coincides with a hierarchical structure of the directories, and the encryption keys of all the directories under a directory IDn are encrypted with the encryption key of the directory IDn and stored in the directory IDn. The user is only required to have the encryption key of one directory alone in the hierarchical structure to access all the directories under that directory. As a result, the burden of managing the keys imposed on the user can be less than when each data are encrypted with different encryption keys.

However, in the method of the above-mentioned document, all the data in the directory cannot be accessed if the user has lost the encryption key. In other words, the burden of managing the keys imposed on the user is reduced, but the effect of losing one encryption key is greater.

For example, when the encryption key is stored in a storage device such as a smartcard, all the encrypted data in the secret information management apparatus cannot be decrypted, for example, if the storage medium is lost.

BRIEF SUMMARY OF THE INVENTION

According to an aspect of the present invention, there is provided a secret information management apparatus based on a (k, n) threshold secret sharing scheme having the threshold value k and the share number n, the apparatus comprising:

a data receiving unit which receives data and a user ID;

a public key list storage unit which stores a public key list in association with the threshold value k, the public key list including n sets of distributed manager IDs, distributed manager public keys and distributed manager address information and also including the user ID and a user public key corresponding to the user ID;

a data key creation unit which creates a data key using random numbers;

an encrypted data outputting unit which encrypts the data using the data key and outputs encrypted data;

a distributed key creation unit which secretly distributes the data key created by the data key creation unit using the (k, n) threshold secret sharing scheme to create n distributed keys;

an encrypted distributed key creation unit which reads n distributed manager public keys in the public key list from the received user ID, encrypts the n distributed keys using the respective distributed manager public keys, and outputs n encrypted distributed keys;

an encrypted data storage unit which stores the encrypted data and the n encrypted distributed keys;

an encrypted distributed key transmission unit which transmits n encrypted distributed keys in the encrypted data storage unit to the respective distributed manager addresses in the public key list when a request to decrypt the encrypted data is received;

a data key restore unit which restores the data key using the (k, n) threshold secret sharing scheme when the encrypted distributed keys are individually decrypted by distributed manager secret keys at transmission destinations of the encrypted distributed keys and the distributed keys are received from k transmission destinations; and a decryption unit which decrypts the encrypted data using the data key to obtain the data.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic diagram showing the configuration of a secret information management system according to a first embodiment of the present invention;

FIG. 7 is a conceptual diagram of a data flow in the encryption according to the first embodiment of the present invention;

FIG. 12 is a schematic diagram showing the configuration of a secret information management system according to a second embodiment of the present invention;

FIG. 13 is a flowchart for explaining the operation of encryption according to the second embodiment of the present invention;

FIG. 14 is a conceptual diagram of a data flow for explaining the operation according to the second embodiment of the present invention;

FIG. 17 is a conceptual diagram of a data flow for explaining the operation according to the third embodiment of the present invention;

FIG. 20 is a conceptual diagram of a data flow for explaining the operation according to the fourth embodiment of the present invention.

DETAILED DESCRIPTION OF THE INVENTION

Figure 2:
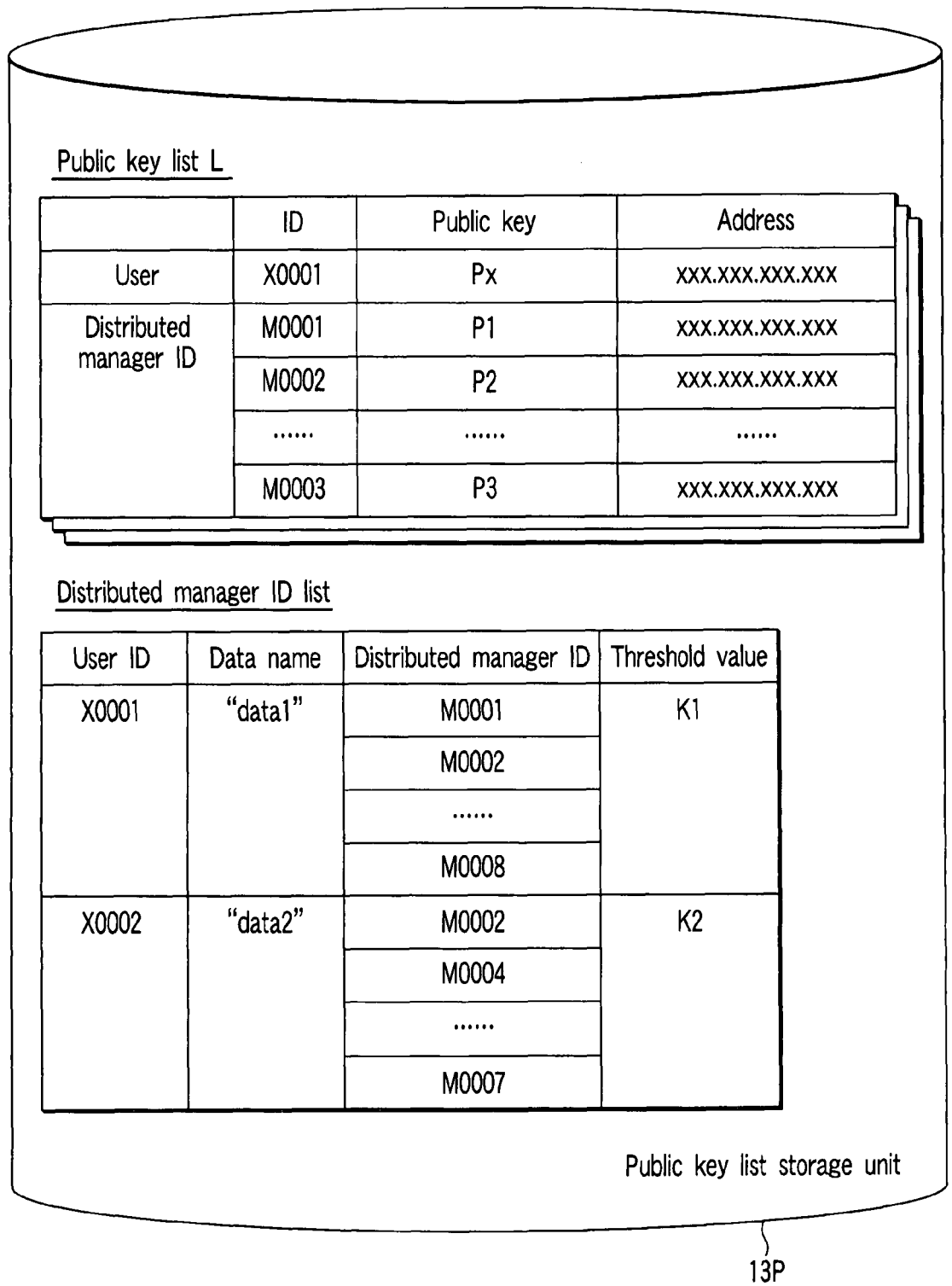
FIG. 2 is a schematic diagram showing the configuration of a public key list storage unit according to the first embodiment of the present invention.

Embodiments of the present invention will hereinafter be described with reference to the drawings.

First Embodiment (1-1. Configuration)

FIG. 1 is a schematic diagram showing the configuration of a secret information management system according to a first embodiment of the present invention.

The secret information management system comprises a secret information management apparatus 10 for storing encrypted data obtained by encrypting data, a user terminal 20 for inputting data, and distributed manager terminals 30A to 30N. (In the following explanation, the distributed manager terminals are simply indicated by "30" when generically described, and indicated with indices A to N when individually described.)

The secret information management apparatus 10 can use a (k, n) threshold secret sharing scheme having a "threshold value k" and a "share number n", and is configured by a general personal computer (PC). It is to be noted that the (k, n) threshold secret sharing scheme is a technique for distributing secret information (here, a data key) into n items of distributed information (here, distributed keys) and permitting the original secret information can be reconstructed if arbitrary k out of n items of distributed information are combined together. However, no information on the original secret information can be obtained from k-1 items of distributed information. That is, the (k, n) threshold secret sharing scheme has a secret information restoration characteristic using the threshold value k as a borderline (note that 1<k<n). Hereinafter, the (k, n) threshold secret sharing scheme is also referred to as a (k, n) threshold method.

Specifically, the secret information management apparatus 10 comprises a communication device 11, a CPU 12, a disk device 13 and a memory 14.

The communication device 11 communicates with the user terminal 20 and the distributed manager terminal 30 via a network, and receives "data D", distributed manager IDs for the share number n, the threshold value k and a user ID from the user terminal 20. The communication device 11 also receives a user public key Px from the user terminal 20 or from a public key book (not shown) on the network.

The CPU 12 performs computing processing of the secret information management apparatus 10, and more specifically, reads various programs stored in the disk device 13 into the memory 14, and executes processing of a data key creation unit 15, a secret distribution unit 16, an encryption unit 17, a data management unit 18 and a decryption unit 19 that will be described later. Here, the various programs are programs for enabling the computer of the secret information management apparatus 10 to perform the functions of the units 15 to 19.

The disk device 13 is, for example, a hard disk for storing and saving information, and functions as a public key list storage unit 13P and an encrypted data storage unit 13Q.

The public key list storage unit 13P prestores a "public key list L" including n or more sets of distributed manager IDs, distributed manager public keys and distributed manager address information and also including the user ID and a user public key corresponding to the user ID (FIG. 2). The public key list storage unit 13P also stores, as a "distributed manager ID list", a data name (hereinafter referred to as "data") of data D received by the communication device 11 from the user terminal 20, the distributed manager IDs for the share number n, and the threshold value k, in association with the user IDs of the users who have transmitted the data (FIG. 2).

In addition, the data name "data" is, for example, a file name when the data D is a file, and is previously included in the data D. Moreover, the threshold value k does not necessarily have to be stored. For example, when the (k, n) threshold method is used so that (k, n) are fixed, the threshold value k is not stored.

Figure 3:
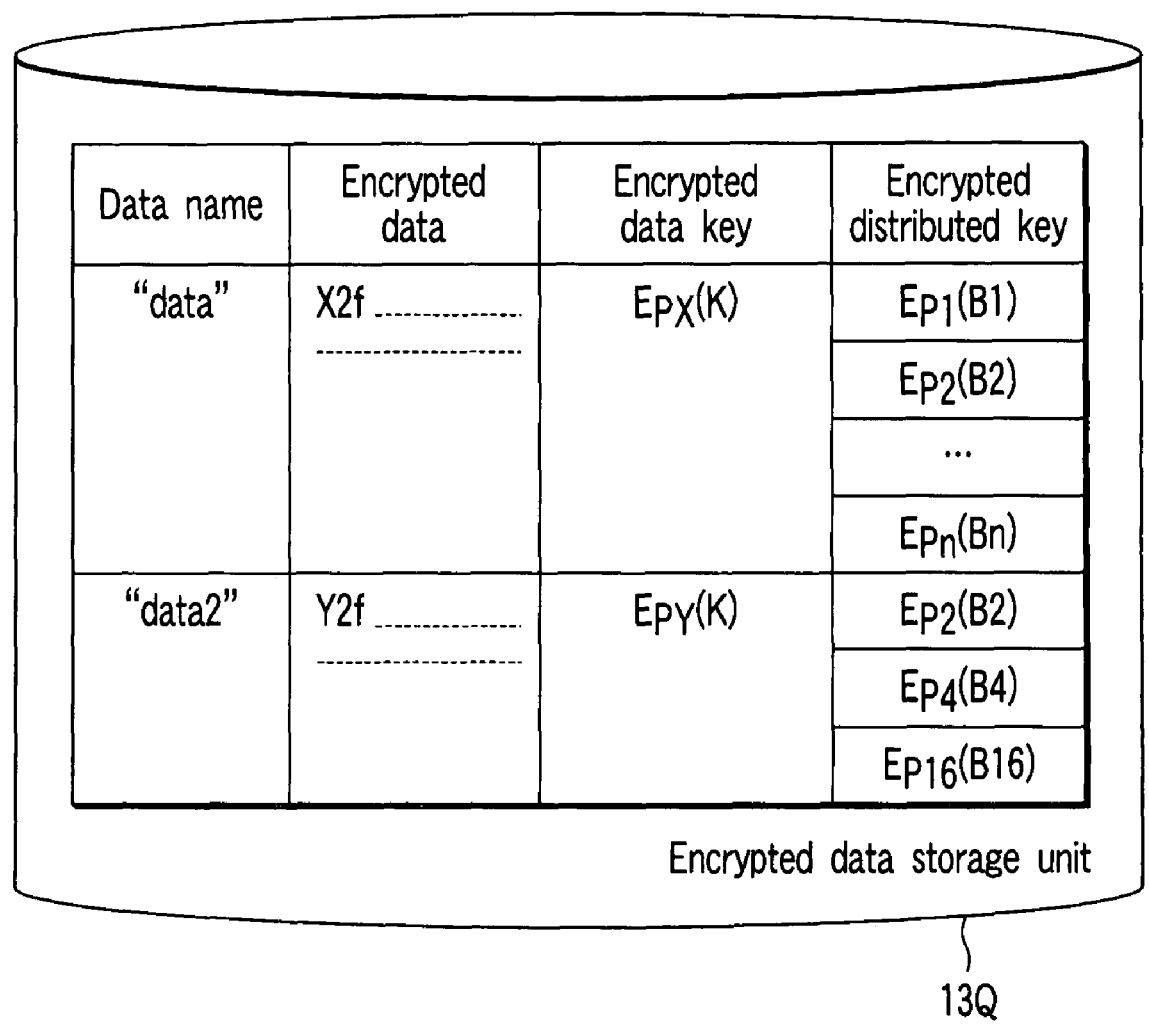
FIG. 3 is a schematic diagram showing the configuration of an encrypted data storage unit according to the first embodiment of the present invention.

The encrypted data storage unit 13Q stores encrypted data $E_K(D)$, an encrypted data key $E_{Px}(K)$ and n encrypted distributed keys $E_{P1}(B1)$, $E_{P2}(B2)$, ..., $E_{Pn}(Bn)$ that will be described later, in association with the data name "data" (FIG. 3).

The memory 14 is a storage device such as a RAM used by the CPU 12 to execute the various programs. Here, when the various programs stored in the disk device 13 are read into the memory 14, the CPU 12 functions as the data key creation unit 15, the secret distribution unit 16, the encryption unit 17, the data management unit 18 and the decryption unit 19.

The data key creation unit 15 create a "data key K" using random number each time the data D is received from the user terminal 20. The created data key K may be the random numbers itself or a value calculated from the random numbers.

The secret distribution unit 16 distributes the data key K created by the data key creation unit 15 into "n distributed keys B1, B2, ..., Bn" by the (k, n) threshold method. It is to be noted that the threshold value k and the share number n are natural number transmitted from the user terminal 20 via the communication device 11.

The encryption unit 17 encrypts various kinds of data, and has a function of using the data key K created in the data key creation unit 15 to encrypt the data D transmitted from the user terminal 20. Thus, the "encrypted data $E_K(D)$" is generated. The encryption unit 17 also has a function of searching the public key list storage unit 13P for the user public key Px corresponding to the received user ID, encrypt the data key K using the user public key Px, and creating the "encrypted data key $E_{Px}(K)$". Further, the encryption unit 17 also has a function of reading "distributed manager public keys P1, P2, ..., Pn" corresponding to the n distributed manager IDs received by the communication device 11 from the public key list storage unit 13P, encrypting the n distributed keys B1, B2, ..., Bn created by the secret distribution unit 16 using the respective distributed manager public keys, and creating the "n encrypted distributed keys $E_{P1}(B1)$, $E_{P2}(B2)$, ..., $E_{Pn}(Bn)$".

The data management unit 18 issues a command to encrypt or decrypt the data D. The data management unit 18 has a function of writing a set of the encrypted data $E_K(D)$, the encrypted data key $E_{Px}(K)$ and the encrypted distributed keys $E_{P1}(B1)$, $E_{P2}(B2)$, ..., $E_{Pn}(Bn)$ that have been created via units 15, 16 and 17, into the encrypted data storage unit 13Q in data encryption processing. The data management unit 18 also has a function of reading information such as the encrypted data $E_K(D)$, the encrypted data key $E_{Px}(K)$ and the encrypted distributed keys $E_{P1}(B1)$, $E_{P2}(B2)$, ..., $E_{Pn}(Bn)$ that have been stored in the encrypted data storage unit 13Q, and sending the information to the decryption unit 19 in the decryption processing of the encrypted data $E_K(D)$.

The decryption unit 19 is equipped with a function of judging whether decryption method information transmitted from the user terminal 20 is first decryption method information F1 or second decryption method information F2, and a function of decrypting the encrypted data $E_K(D)$ stored in the encrypted data storage unit 13Q, in accordance with the result of the judgment.

Specifically, when the decryption method information is the first decryption method information F1, the encrypted data key $E_{Px}(K)$ is transmitted to the user terminal 20 together with a request to decrypt the encrypted data key. Then, in response to the request to decrypt the encrypted data key $E_{Px}(K)$, the encrypted data $E_K(D)$ is decrypted by the received data key K when the data key K decrypted by a user secret key Sx corresponding to the user public key Px is received from the user terminal 20.

On the other hand, when the decryption method information is the second decryption method information F2, n encrypted distributed keys $E_{P1}(B1)$, $E_{P2}(B2)$, ..., $E_{Pn}(Bn)$ in the encrypted data storage unit 13Q are transmitted to the respective distributed manager terminal 30 on the basis of n items of distributed manager address information included in the public key list L prestored in the public key list storage unit 13P. Subsequently, the encrypted distributed keys are decrypted by "distributed manager secret keys S1, S2, ..., Sn" at the transmission destinations of the encrypted distributed keys $E_{P1}(B1)$, $E_{P2}(B2)$, ..., $E_{Pn}(Bn)$. If distributed keys are received from k transmission destinations, the data key K is reconstructed using the (k, n) threshold method. Then, the encrypted data $E_K(D)$ is decrypted using the restored data key K.

Figure 4:
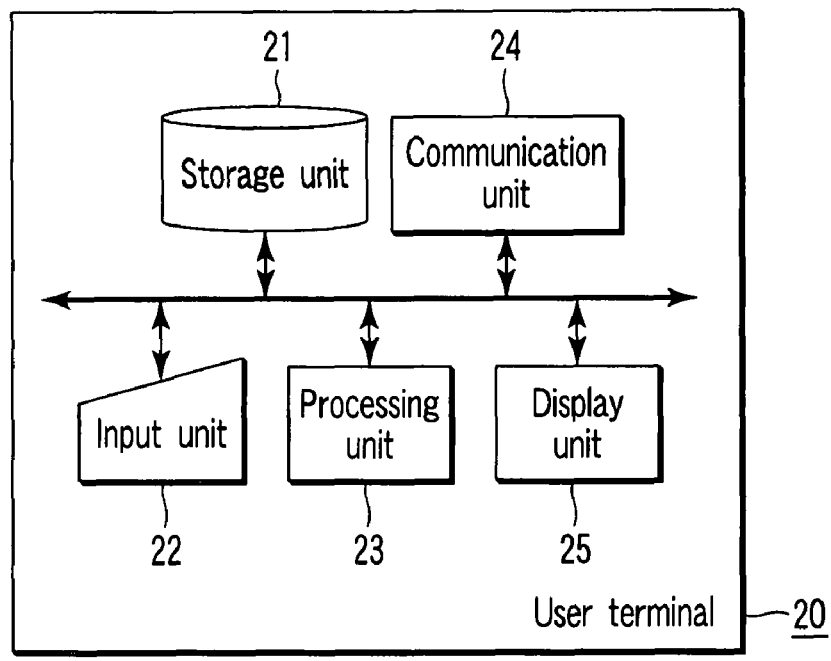
FIG. 4 is a schematic diagram showing the configuration of a user terminal according to the first embodiment of the present invention.

The user terminal 20 has a function of an ordinary personal computer, and inputs the data D to the secret information management apparatus 10 or requests to decrypt the encrypted data $E_K(D)$ in accordance with the operation of the user. Specifically, as shown in FIG. 4, the user terminal 20 comprises a storage unit 21, an input unit 22, a processing unit 23, a communication unit 24 and a display unit 25 that are connected to each other by a bus.

The storage unit 21 is a memory for storing the "user secret key Sx" corresponding to the user public key Px. In addition, the user secret key Sx is stored after being encrypted by, for example, a password which can be only known to the user. Moreover, the user secret key Sx may be stored in an external storage device such as a smartcard.

The input unit 22 inputs information for carrying out the encryption and decryption of the data D. For example, when the data D is encrypted, the input unit 22 enables the input of the data D, the distributed manager IDs, the threshold value k and the "user ID" for identifying the user. However, the threshold value k does not necessarily have to be input. For example, when the (k, n) threshold method is used so that (k, n) are fixed, the threshold value k does not have to be input. Moreover, when the encrypted data $E_K(D)$ is decrypted, the input unit 22 enables the input of the data name "data" for specifying the encrypted data $E_K(D)$ and the input of the decryption method information. It is to be noted that the "decryption method information" includes the first decryption method information F1 for instructing to decrypt the encrypted data using the encrypted data key, and the second decryption method information F2 for instructing to decrypt the encrypted data using the encrypted distributed key. When the second decryption method information F2 is input and the permission of distributed managers is required (FIG. 5), the user may make user information (e.g., the user ID, user name, user attributes) to be included in the request to decrypt the encrypted data $E_K(D)$ by an input operation and the secret information management apparatus 10 may transmit the user information together with the encrypted distributed key to the distributed manager terminal 30. In addition to the above configuration, the secret information management apparatus 10 may further be configured to prestore the user information, access the disk device 13 on the basis of the data name "data" included in the request to decrypt the encrypted data $E_K(D)$, and transmit the user information relevant to the corresponding user ID to the distributed manager terminal 30 together with the encrypted distributed key. In addition, when the permission of the distributed managers is not required, the configuration associated with the user information can be dispensed with.

The processing unit 23 decrypts the encrypted data key $E_{Px}(K)$ in response to the decryption request from the secret information management apparatus 10. Specifically, the user secret key Sx stored in the storage unit 21 is used to decrypt the encrypted data key $E_{Px}(K)$. When the user secret key Sx is stored in the smartcard, a command to decrypt the encrypted data key $E_{Px}(K)$ in the smartcard is sent to the smartcard.

The communication unit 24 enables a communication with the secret information management apparatus 10. In addition, in the communication with the secret information management apparatus 10, it is necessary to input the user ID, etc., to identify the user to which data is transmitted.

The display unit 25 is, for example, a display for displaying input information in the input unit 22, the data transmitted from the secret information management apparatus 10, etc.

The distributed manager terminal 30 decrypts the respective encrypted distributed keys $E_{P1}(B1)$, $E_{P2}(B2)$, . . . , $E_{Pn}(Bn)$ by the "distributed manager secret keys S1, S2, . . . , Sn" as necessary, when receiving a request to decrypt the encrypted distributed key from the secret information management apparatus 10. The distributed manager terminal 30 also transmits the decrypted distributed key to the secret information management apparatus 10.

Figure 5:
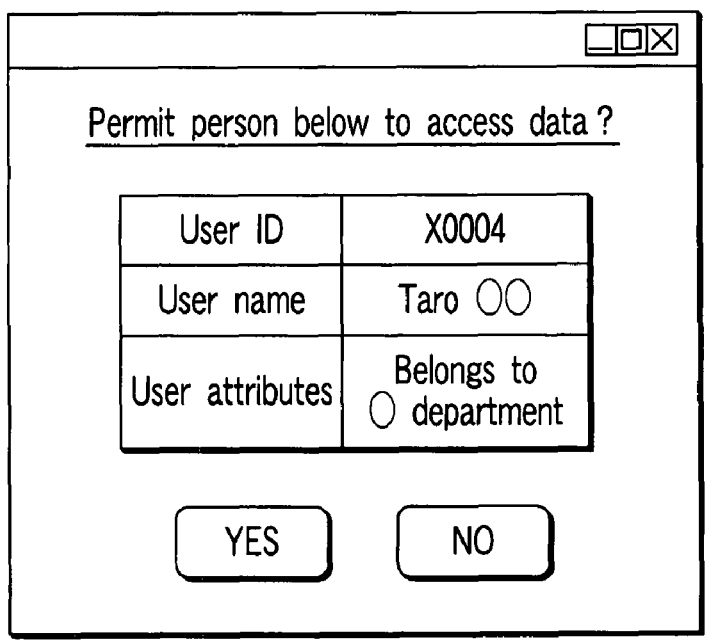
FIG. 5 is a schematic diagram showing an example of a screen configuration of a distributed manager device according to the first embodiment of the present invention.

In addition, the distributed manager terminal 30 has a function of displaying on a screen the user information with which the decryption of the encrypted data has been requested, as shown in an example of a screen configuration in FIG. 5, and requesting the distributed manager to permit the decryption, when receiving the request to decrypt the encrypted distributed key (In FIG. 5, the decryption of the encrypted distributed key is rejected if a "NO" button is selected). Thus, when the distributed manager operating the distributed manager terminal 30 determines not to permit the decryption of the encrypted distributed key, the distributed key can be prevented from being transmitted to the secret information management apparatus 10.

(1-2. Operation)

Next, the operation of the secret information management system according to the present embodiment will be described.

(Encryption of Data)

Figure 6:
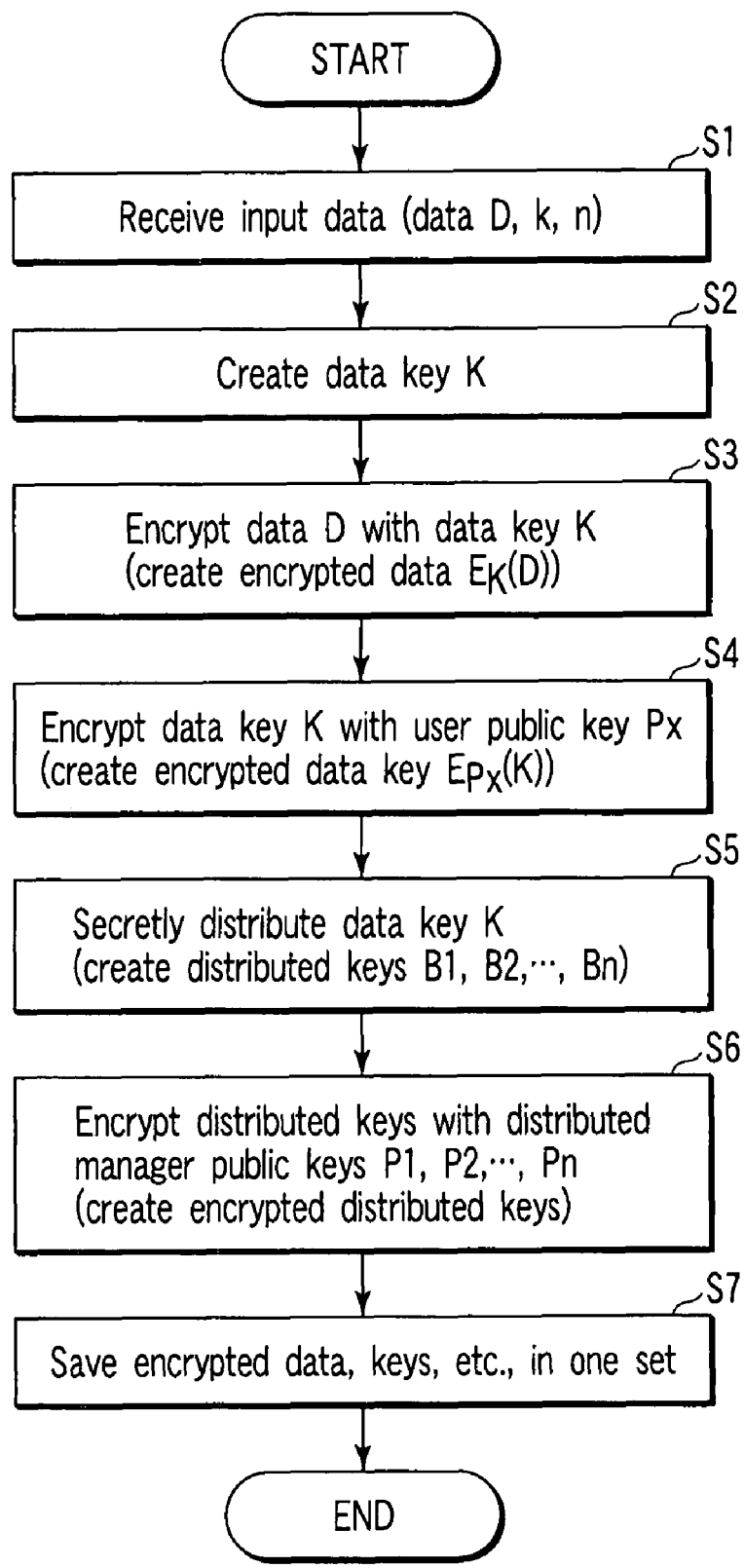
FIG. 6 is a flowchart for explaining the operation of encryption according to the first embodiment of the present invention.

First, the operation of data encryption by the secret information management system according to the present embodiment is explained using a flowchart in FIG. 6. In addition, the concept of a data flow in the encryption is shown in FIG. 7.

To start with, the data D, the distributed manager IDs for the share number n, the threshold value k and the user ID are input by user operation in the user terminal 20. Then, the user terminal 20 transmits the input data to the secret information management apparatus 10.

The secret information management apparatus 10 stores the received input data in the memory 14, and also stores in the public key list storage unit 13P the "distributed manager ID list" which includes the user ID, the data name "data", the distributed manager IDs and the threshold value k in association with each other.

Subsequently, in the secret information management apparatus 10, the data key creation unit 15 creates the data key K using the random numbers (steps S1 and S2). Further, in the secret information management apparatus 10, the encryption unit 17 encrypts the data D with the data key K to generate the encrypted data $E_K(D)$ (step S3).

Then, the encryption unit 17 searches the public key list storage unit 13P for the user public key Px corresponding to the received user ID. Further, the encryption unit 17 encrypts the data key K created in step S2 using the user public key Px that has been searched for, thereby creating the encrypted data key $E_{Px}(K)$ (step S4).

Furthermore, the secret distribution unit 16 creates n distributed keys B1, B2, . . . , Bn from the data key K created in step S2, in accordance with the (k, n) threshold method (step S5).

Then, the encryption unit 17 reads the distributed manager public keys P1, P2, . . . , Pn associated with the received distributed manager IDs from the public key list L, individually encrypts, using the n distributed manager public keys P1, P2, . . . , Pn, the n distributed keys B1, B2, . . . , Bn created by secret distribution, and creates n encrypted distributed keys $E_{P1}(B1)$, $E_{P2}(B2)$, . . . , $E_{Pn}(Bn)$ (step S6).

Moreover, the data management unit 18 of the secret information management apparatus 10 stores a set of the encrypted data $E_K(D)$, the encrypted data key $E_{Px}(K)$ and the encrypted distributed keys $E_{P1}(B1)$, $E_{P2}(B2)$, . . . , $E_{Pn}(Bn)$, in the encrypted data storage unit 13Q of the disk device 13 (step S7).

(Decryption of Encrypted Data)

Figure 8:
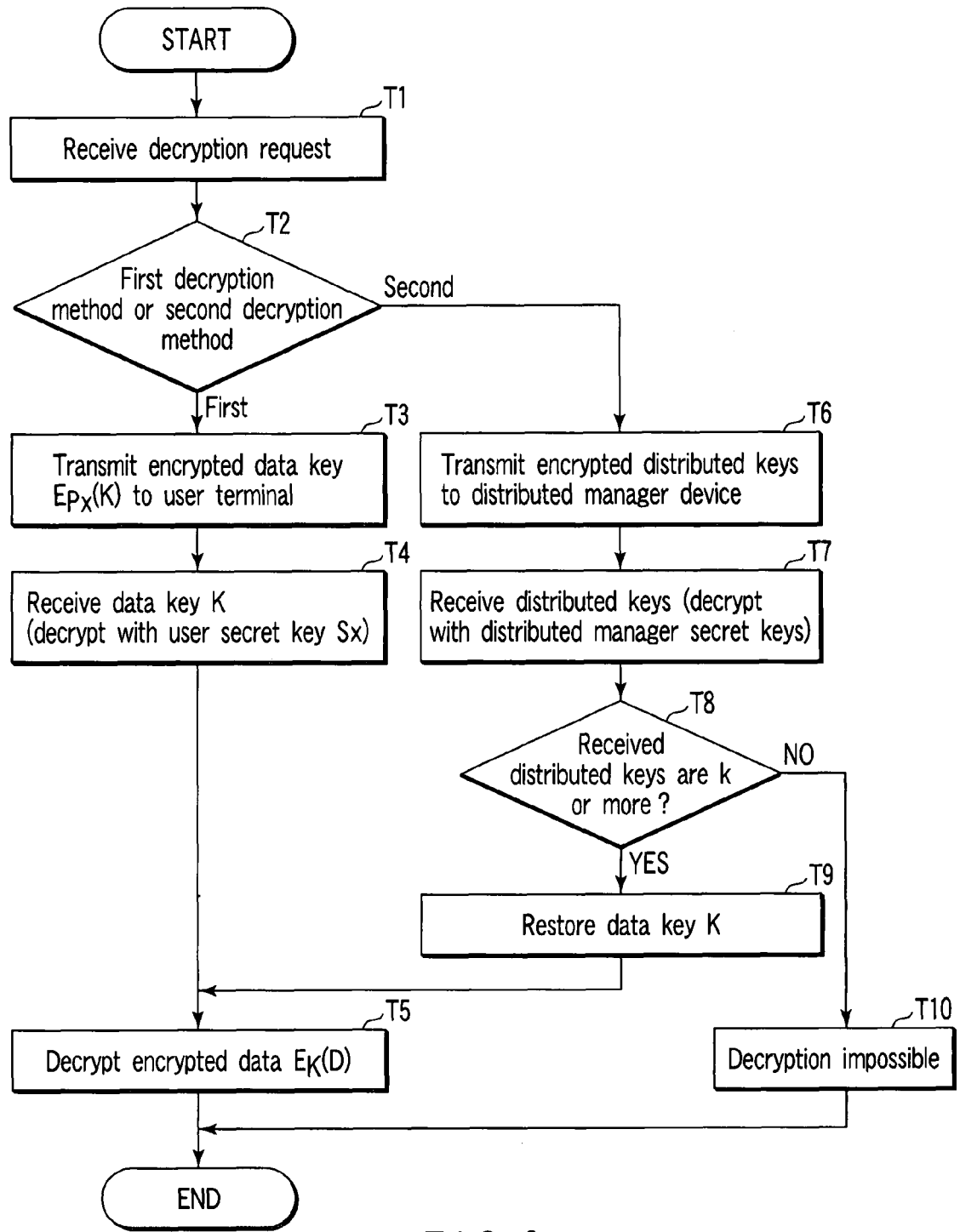
FIG. 8 is a flowchart for explaining the operation of decryption according to the first embodiment of the present invention.
Figure 9:
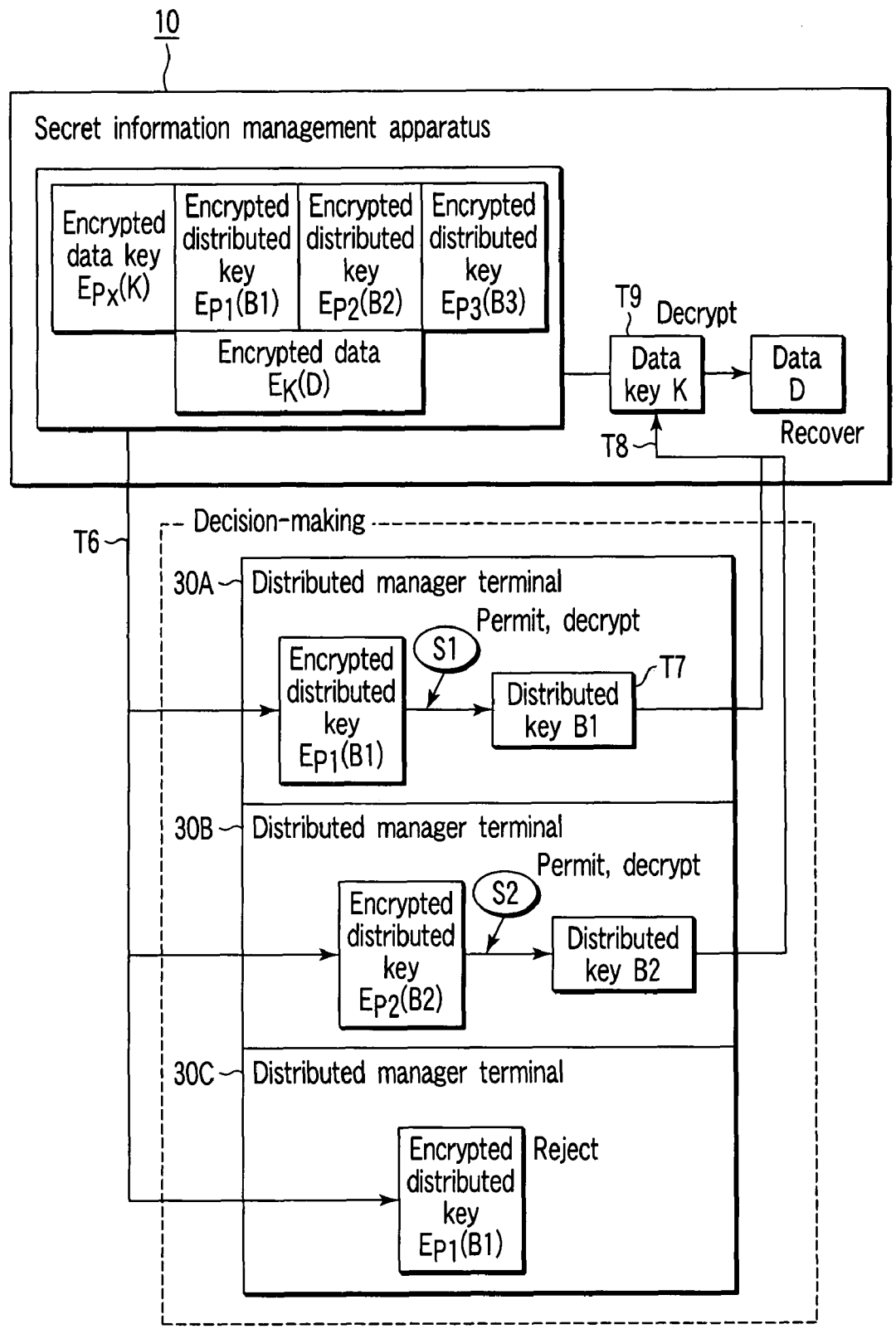
FIG. 9 is a conceptual diagram of a data flow in the decryption by a second decryption method according to the first embodiment of the present invention.

Next, the operation of the data decryption of the encrypted data by the secret information management system according to the present embodiment is explained using a flowchart in FIG. 8. In addition, the concept of a data flow in the decryption in accordance with a second decryption method is shown in FIG. 9.

Figure 10:
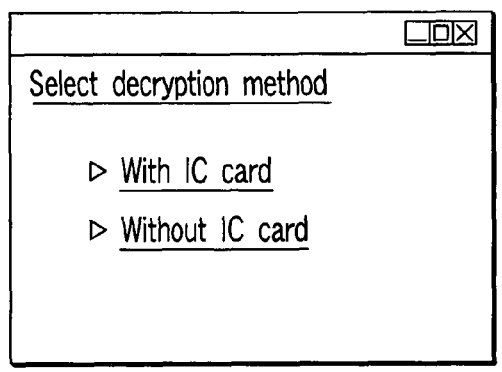
FIG. 10 is a schematic diagram showing one example of a screen configuration of the user terminal according to the first embodiment of the present invention.

To start with, the user terminal 20 transmits a request to decrypt the encrypted data $E_K(D)$ to the secret information management apparatus 10 in accordance with the input operation of the user. At this point, the data name "data" of the encrypted data $E_K(D)$, the decryption method information (F1 or F2), etc., are transmitted together with the decryption request. In addition, the transmitted contents of the decryption method information are selected on the display unit 25 of the user terminal 20 by user operation. Specifically, when the user secret key Sx is stored in the smartcard, "with smartcard" or "without smartcard" is selected by user operation in accordance with whether the smartcard is present, as shown in one example of a screen configuration in FIG. 10. The first decryption method information F1 is transmitted when "with smartcard" is selected, while the second decryption method information F2 is transmitted when "without smartcard" is selected.

On receipt of the decryption request, the secret information management apparatus 10 judges whether the decryption method information is the first decryption method information F1 or the second decryption method information F2 (steps T1 and T2).

Here, when the decryption method information is the first decryption method information F1, the decryption unit 19 transmits the encrypted data key $E_{Px}(K)$ stored in the encrypted data storage unit 13Q to the user terminal 20 together with the decryption request in the secret information management apparatus 10 (step T3).

The user terminal 20 decrypts the received encrypted data key $E_{Px}(K)$ with the user secret key Sx, and transmits the obtained data key K to the secret information management apparatus 10.

Subsequently, in the secret information management apparatus 10, the decryption unit 19 decrypts the encrypted data $E_K(D)$ using the received data key K (step T5).

On the other hand, when the decryption method information is the second decryption method information F2 in step T2, the decryption unit 19 individually transmits n encrypted distributed keys $E_{P1}(B1)$, $E_{P2}(B2)$, . . . , $E_{Pn}(Bn)$ in the encrypted data storage unit 13Q to the distributed manager terminals 30A to 30N on the basis of n distributed manager address information included in the public key list L in the public key list storage unit 13P, in the secret information management apparatus 10 (step T6).

As a result, each of the distributed manager terminals 30A to 30N judges whether to permit the decryption or not. Specifically, the distributed managers using the distributed manager terminals 30A to 30N individually judge whether or not to permit the user who has requested to decrypt the encrypted data $E_K(D)$ via the user terminal 20 to access the data D.

In the distributed manager terminal 30, the received encrypted distributed keys are decrypted with the distributed manager secret keys when the distributed managers permit the decryption of the data D (the distributed manager terminals 30A and 30B in FIG. 9). Then, the distributed manager terminals 30A and 30B which have permitted the decryption return the distributed keys to the secret information management apparatus 10.

On the other hand, when the distributed managers reject the decryption of the data D, the encrypted distributed keys are not decrypted in the distributed manager terminal 30, and no distributed keys are therefore returned to the secret information management apparatus 10 (the distributed manager terminal 30C in FIG. 9).

Then, in the secret information management apparatus 10, the decryption unit 19 accesses the threshold value k in the public key list storage unit 13P, and judges whether the number of distributed keys received from the plurality of distributed manager terminals 30 is equal to or more than the threshold value k (step T8).

When the number is judged to be k or more, the decryption unit 19 restores the data key K from k distributed keys using the (k, n) threshold method in the secret information management apparatus 10 (step T8-Yes, T9). Then, the decryption unit 19 decrypts the encrypted data $E_K(D)$ with the restored data key K (step T5).

On the other hand, when the number is judged to be smaller than k in step T8, the data key K is not restored from the distributed key and the processing is terminated with the conclusion that the encrypted data $E_K(D)$ cannot be decrypted in the secret information management apparatus 10 (step T8-No, T10).

(1-3. Effects)

As described above, the secret information management apparatus 10 according to the present embodiment comprises: the secret distribution unit 16 which secretly distributes the data key K using the (k, n) threshold secret sharing scheme and creates n distributed keys B1, B2, ..., Bn in the decryption of the data D; the encryption unit 17 which individually encrypts n distributed keys B1, B2, ..., Bn using n distributed manager public keys P1, P2, ..., Pn in the public key list, and creates n encrypted distributed keys $E_{P1}(B1)$, $E_{P2}(B2)$, ..., $E_{Pn}(Bn)$; and the encrypted data storage unit 13Q which stores the encrypted data $E_K(D)$, the encrypted data key $E_{Px}(K)$ and the n encrypted distributed keys $E_{P1}(B1)$, $E_{P2}(B2)$, ..., $E_{Pn}(Bn)$ in association with each other. The secret information management apparatus 10 also comprises the decryption unit 19. Thus, when the encrypted data is decrypted using the encrypted distributed keys, the n encrypted distributed keys $E_{P1}(B1)$, $E_{P2}(B2)$, ..., $E_{Pn}(Bn)$ are individually transmitted to the distributed manager terminals 30A to 30N on the basis of n distributed manager address information included in the public key list L, and the encrypted distributed keys are individually decrypted with the distributed manager secret keys S1, S2, ..., Sn at the transmission destinations of the encrypted distributed keys $E_{P1}(B1)$, $E_{P2}(B2)$, ..., $E_{Pn}(Bn)$. When distributed keys are received from k transmission destinations, the data key K is restored using the (k, n) threshold method. Then, the encrypted data $E_K(D)$ can be decrypted using the data key K. Therefore, even when the user secret key Sx is lost, the data D can be decrypted, if k or more out of n distributed keys are collected to restore the data key K.

In other words, the secret information management apparatus 10 can use one of the two decryption methods: the first decryption method wherein the data key K decrypted with the user secret key Sx is received after the transmission of the encrypted data key $E_{Px}(K)$, and data is obtained by decrypting the encrypted data $E_K(D)$ with the data key K, and the second decryption method wherein n encrypted distributed keys $E_{P1}(B1)$, $E_{P2}(B2)$, ..., $E_{Pn}(Bn)$ are transmitted and k distributed keys are received to restore the data key K using the (k, n) threshold secret sharing scheme, and the data D is obtained by decrypting the encrypted data $E_K(D)$ using the obtained data key K. Thus, when the user keeps the encryption key (user secret key Sx), the first decryption method can be used to decrypt the encrypted data. When the user has lost the encryption key (user secret key Sx) as well, the second decryption method can be used to decrypt the encrypted data.

Furthermore, according to the secret information management system in the present embodiment, the user has only to manage the user secret key Sx, and the distributed managers also have only to manage the distributed manager secret keys S1, S2, ..., Sn, such that the management of the key by each person can be simplified.

Especially when the secret key of each person is managed by or stored in the smartcard, it is possible to construct a system with enhanced safety and convenience. Further, the smartcard carried by each person is used, such that individual decisions can be more clearly and safely reflected with regard to the decryption of data than when the terminals 20 and 30 which are available for other persons are used. Moreover, the use of the smartcards enables the process from the decision-making of each person to the decryption to be achieved by cryptographic technologies.

Figure 11:
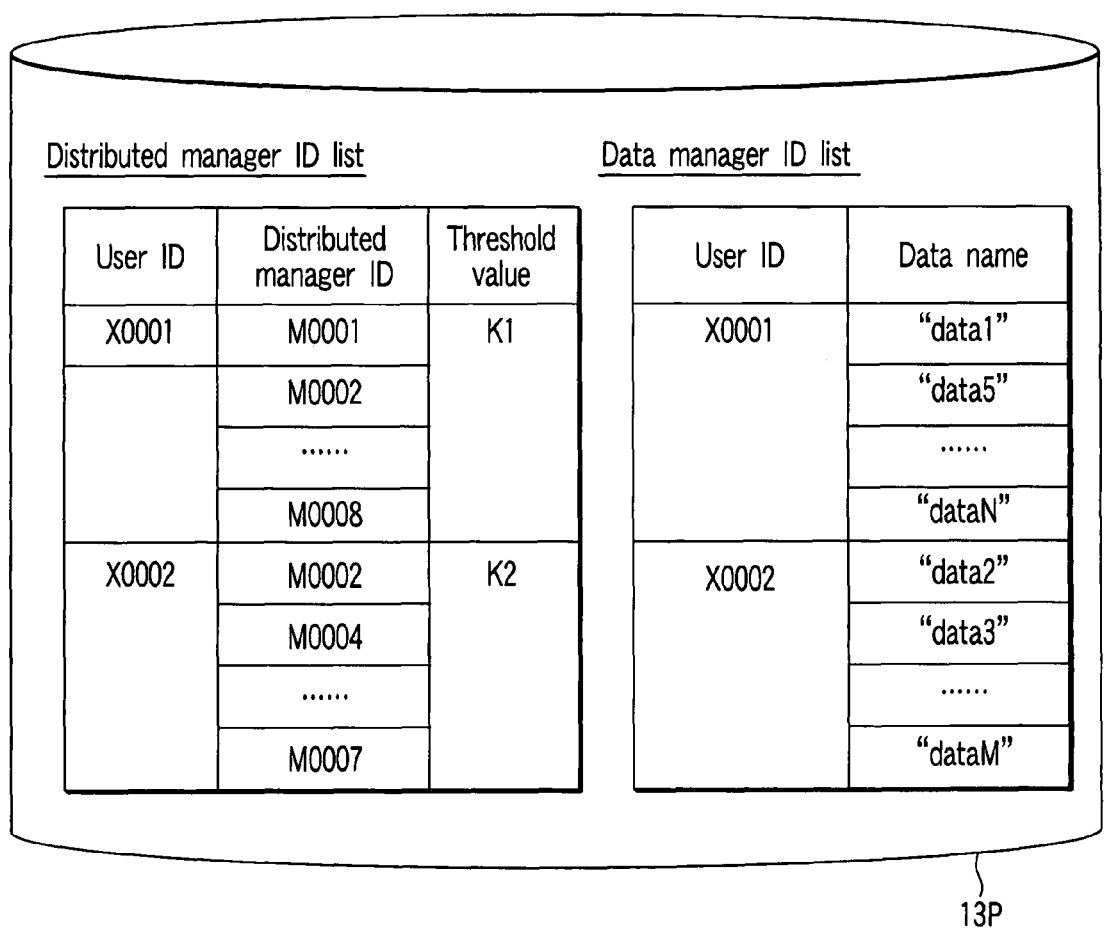
FIG. 11 is a schematic diagram showing a modification of a disk device according to the first embodiment of the present invention.

In addition, while the distributed manager IDs for the share number n and the threshold value k are received from the user terminal 20 in the secret information management apparatus 10 according to the present embodiment, such information may be prestored. This is equivalent to specifying the distributed managers for each user in advance. Specifically, as shown in FIG. 11, the disk device 13 of the secret information management apparatus 10 prestores the distributed manager IDs and the threshold value k as the "distributed manager ID list" for each user ID. Thus, when data is transmitted from the user, the distributed keys can be encrypted with the distributed manager public keys in the public key list L in association with the distributed manager IDs specified by the distributed manager ID list for each user ID. That is, the distributed managers are specified in advance for each user, and the distributed keys may be designed to be transmitted to the distributed manager terminals 30 of the specified distributed managers. Moreover, table information indicating which data is under the management of which user is stored in the disk device 13 as a "data manager list" (FIG. 11).

Second Embodiment

FIG. 12 is a schematic diagram showing the configuration of a secret information management system according to a second embodiment of the present invention. It is to be noted that the same signs are assigned to the same parts as those already described, and repetitive explanations are not made unless need arises. Repetitive explanations are not made either in embodiments that follows.

In contrast to the first embodiment, a user terminal 20 is configured to create a data key K and encrypted data $E_K(D)$ in the present embodiment. That is, a processing unit 23 of the user terminal 20 has a function of creating the data key K using random numbers, and a function of encrypting data D using this data key K and outputting the encrypted data $E_K(D)$. Therefore, a secret information management apparatus 10S has a configuration with no data key creation unit 15 unlike the configuration shown in FIG. 1. Moreover, data encryption is not performed in the secret information management apparatus 10S. In addition, the encrypted data $E_K(D)$ and the data key K are transmitted to the secret information management apparatus 10S via a communication unit 24 together with distributed manager IDs, the threshold value k and a user ID.

Next, the operation of data encryption by the secret information management system according to the present embodiment is explained with reference to a flowchart in FIG. 13 and a conceptual diagram of a data flow in FIG. 14.

To start with, the data D, the distributed manager IDs for a share number n, the threshold value k and the user ID are input by user operation in the user terminal 20 (U1).

Then, the processing unit 23 of the user terminal 20 creates the data key K using the random numbers (U2). The processing unit 23 also encrypts the data D using this data key K to output the encrypted data $E_K(D)$ (U3). Then, the communication unit 24 of the user terminal 20 transmits the data to the secret information management apparatus 10S together with the user ID in a storage unit 21 (U4, U5).

Furthermore, on receipt of the encrypted data $E_K(D)$, the data key K, the distributed manager IDs (for n persons), the threshold value k and the user ID as input data from the user terminal 20, the secret information management apparatus 10S stores the input data in a memory 14, and also stores in a public key list storage unit 13P a distributed manager ID list which includes the user ID, a data name "data", the distributed manager IDs and the threshold value k in association with each other.

Then, a secret distribution unit 16 creates n distributed keys B1, B2, ..., Bn from the data key K in the memory 14 in accordance with a (k, n) threshold method (U6).

Then, in the secret information management apparatus 10S, an encryption unit 17 encrypts the n distributed keys B1, B2, ..., Bn with the respective distributed manager public keys P1, P2, ..., Pn to output encrypted distributed keys $E_{P1}(B1), E_{P2}(B2), \ldots, E_{Pn}(Bn)$ in the same manner as described above (U7).

The encryption unit 17 also encrypts the data key K with a user public key Px in a public key list L, and outputs an encrypted data key EPx(K) (U8).

Then, a data management unit 18 of the secret information management apparatus 10S stores the encrypted distributed keys $E_{P1}(B1), E_{P2}(B2), \ldots, E_{Pn}(Bn)$ and the encrypted data key $E_{Px}(K)$ in an encrypted data storage unit 13Q in association with the encrypted data $E_K(D)$ transmitted from the user terminal 20 (U9).

In addition, the operation of decrypting the encrypted data $E_K(D)$ is performed in the same manner as in the first embodiment.

As described above, in the secret information management system according to the present embodiment, the creation of the data key K and the encryption of the data D are carried out with the user terminal 20. Thus, it is not necessary to transmit to the secret information management apparatus 10S the data D which is not encrypted, such that the confidentiality of the data can be enhanced.

In addition, the data D which is not encrypted is received in the secret information management apparatus 10 according to the first embodiment, so that the manager of the secret information management apparatus 10 can view the data. On the contrary, the encrypted data $E_K(D)$ is received instead of the data D which is not encrypted in the secret information management apparatus 10S according to the present embodiment, so that the manager of the secret information management apparatus 10S cannot simply view the data D.

Third Embodiment

Figure 15:
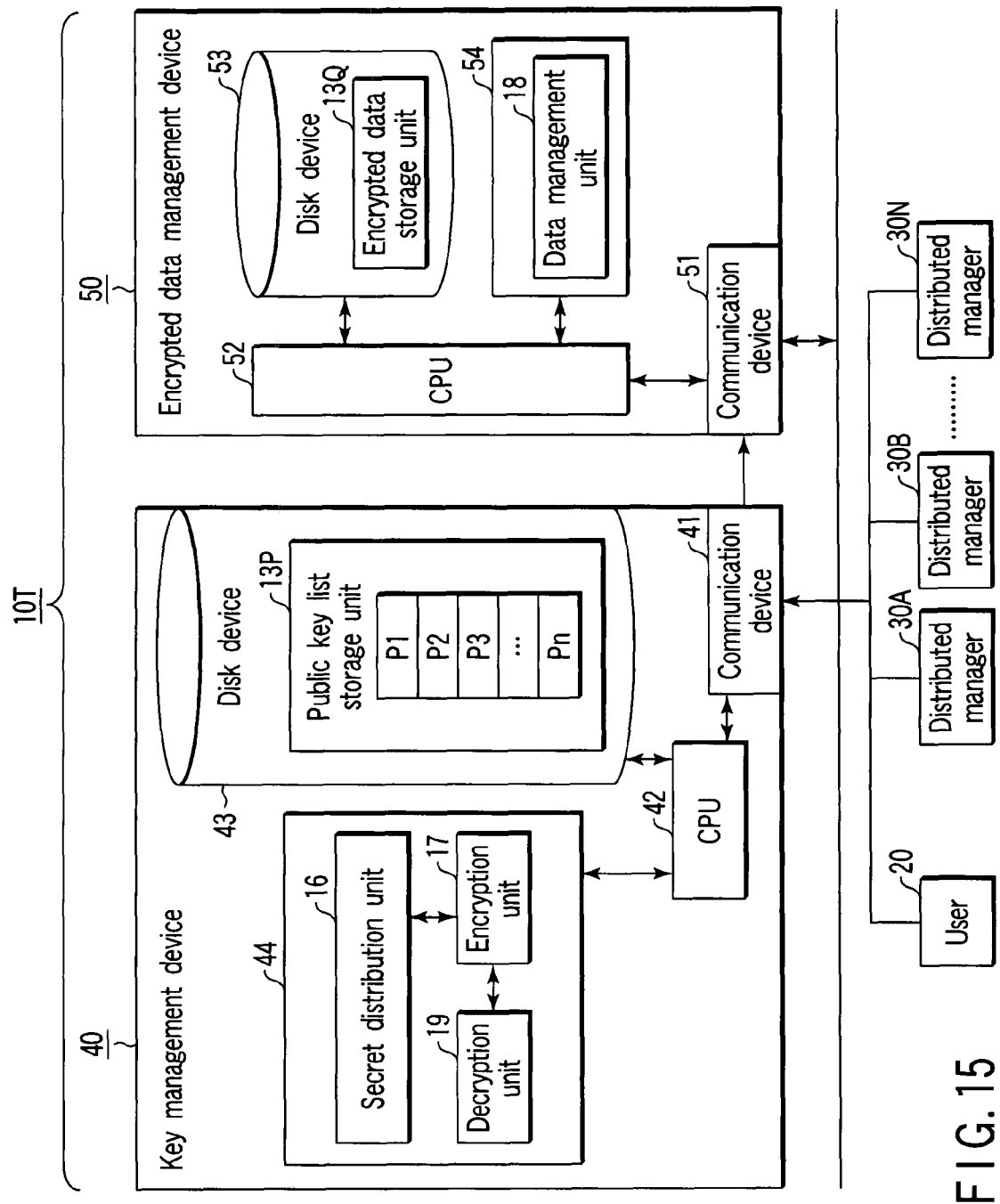
FIG. 15 is a schematic diagram showing the configuration of a secret information management system according to a third embodiment of the present invention.

FIG. 15 is a schematic diagram showing the configuration of a secret information management system according to a third embodiment of the present invention.

The present embodiment is different from the second embodiment in that the secret information management apparatus 10S described above is divided into a key management device 40 and an encrypted data management device 50. The key management device 40 and the encrypted data management device 50 constitute a secret information management apparatus 10T.

In the key management device 40, a disk device 43 functions as a public key list storage unit 13P, a memory 44 reads various programs, and a CPU 42 functions as a secret distribution unit 16, an encryption unit 17 and a decryption unit 19.

In the encrypted data management device 50, a disk device 53 functions as an encrypted data storage unit 13Q, a memory 54 reads various programs, and a CPU 52 functions as a data management unit 18.

The devices 40 and 50 also transmit/receive the encrypted data, etc., via communication devices 41 and 51.

Figure 16:
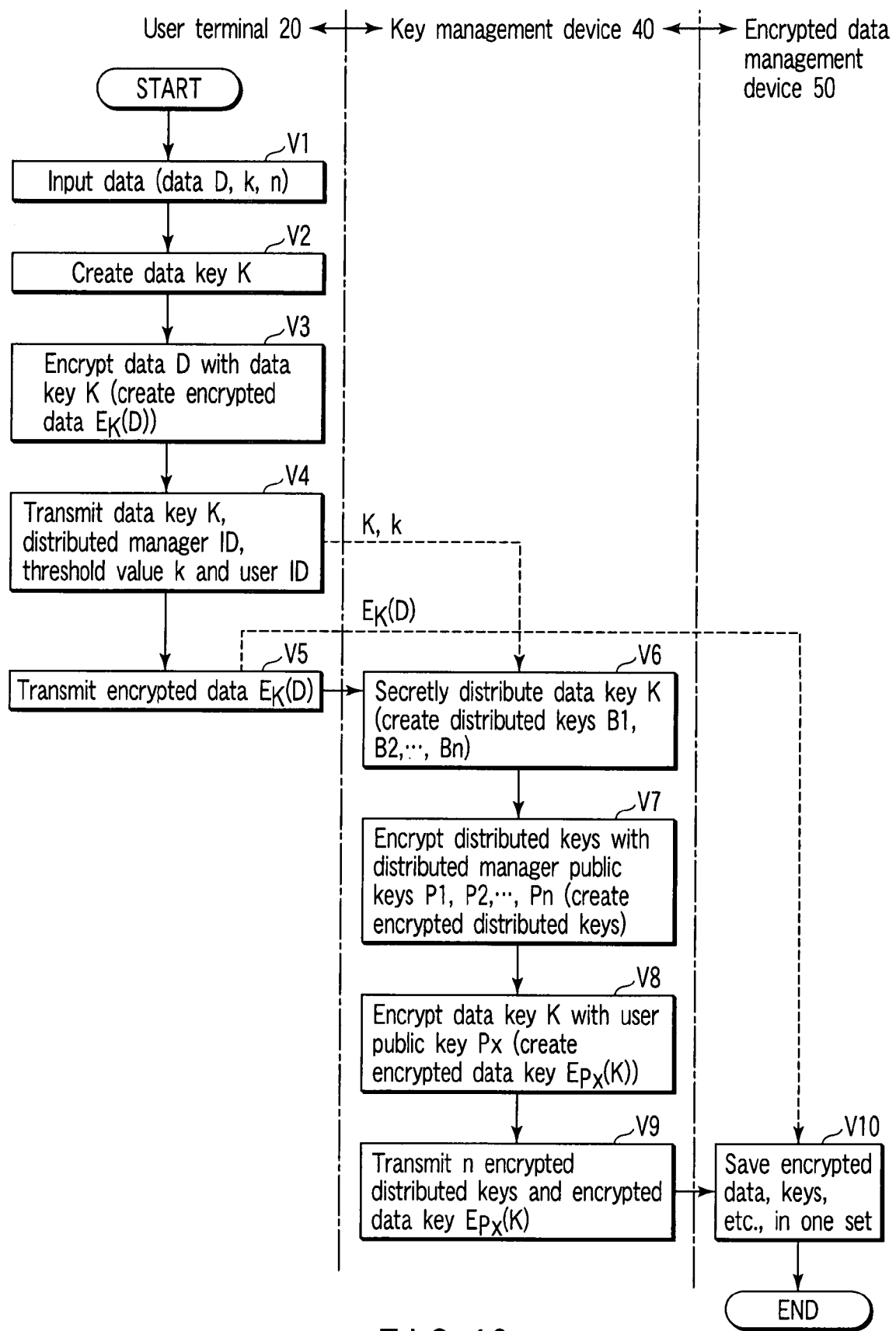
FIG. 16 is a flowchart for explaining the operation of encryption according to the third embodiment of the present invention.

Next, the operation of data encryption by the secret information management system according to the present embodiment is explained with reference to a flowchart in FIG. 16 and a conceptual diagram of a data flow in FIG. 17.

To start with, data D, distributed manager IDs, a threshold value k and a user ID are input by user operation in a user terminal 20 (V1).

Then, a processing unit 23 of the user terminal 20 creates the data key K using random numbers (V2). The processing unit 23 then uses this data key K to encrypt the data D, and outputs encrypted data $E_K(D)$ (V3).

Then, the user terminal 20 transmits the data key K, the distributed manager IDs, the threshold value k and the user ID to the key management device 40 (V4), and transmits the encrypted data $E_K(D)$ to the encrypted data management device 50 (V5).

In the key management device 40, the data key K, the distributed manager IDs, the threshold value k and the user ID that have been received are stored in the memory 44, and a distributed manager ID list which includes the user ID, a data name "data", the distributed manager IDs and the threshold value k in association with each other is stored in the public key list storage unit 13P of the disk device 43. Subsequently, in the key management device 40, the secret distribution unit 16 distributes the data keys K in the memory 44 by a (k, n) threshold method using the public key list L and the threshold value k, thereby creating n distributed keys B1, B2, ..., Bn (V6). Then, in the key management device 40, the encryption unit 17 reads distributed manager public keys P1, P2, ..., Pn associated with the received distributed manager IDs from the public key list L, encrypts, using the respective distributed manager public keys P1, P2, ..., Pn, the distributed keys B1, B2, ..., Bn, and outputs n encrypted distributed keys $E_{P1}(B1), E_{P2}(B2), \ldots, E_{Pn}(Bn)$ (V7).

The encryption unit 17 also encrypts the data key K with a user public key Px, and outputs an encrypted data key Epx(K) (V8).

Then, the key management device 40 transmits the n encrypted distributed keys $E_{P1}(B1)$, $E_{P2}(B2)$, ..., $E_{Pn}(Bn)$ and the encrypted data key Epx(K) to the encrypted data management device 50 (V9).

In the encrypted data management device 50, the data management unit 18 stores the n encrypted distributed keys $E_{P1}(B1)$, $E_{P2}(B2)$, ..., $E_{Pn}(Bn)$ and the encrypted data key Epx(K) in the encrypted data storage unit 13Q of the disk device 53 in association with the encrypted data $E_K(D)$ received from the user terminal 20 (V10).

In addition, the operation of decrypting the encrypted data $E_K(D)$ is performed in the same manner as in the first embodiment. However, the key management device 40 having the decryption unit 19 mainly performs the decryption operation.

As described above, in the secret information management system according to the present embodiment, the secret information management apparatus 10T has a configuration divided into the key management device 40 and the encrypted data management device 50, such that the confidentiality of the data can be enhanced.

In addition, in the secret information management apparatus 10S according to the second embodiment, the device for receiving the data key K and the device for storing the encrypted data $E_K(D)$ are single devices, so that the manager of the secret information management apparatus 10S can decrypt the encrypted data $E_K(D)$ using the received data key K. On the contrary, in the secret information management apparatus 10T according to the present embodiment, the key management device 40 receives the data key K, and the encrypted data management device 50 stores the encrypted data $E_K(D)$, etc. Thus, if the memory 44 of the key management device 40 is a volatile memory, the data key K is erased when power is turned off, so that the encrypted data $E_K(D)$ stored in the encrypted data management device 50 cannot be decrypted. Therefore, the confidentiality of the data D can be enhanced.

Furthermore, in the secret information management apparatus 10S according to the second embodiment, the encrypted distributed keys $E_{P1}(B1)$, $E_{P2}(B2)$, ..., $E_{Pn}(Bn)$ and the encrypted data $E_K(D)$ are stored in the single device, so that the manager of the secret information management apparatus 10S may be able to decrypt the encrypted distributed keys $E_{P1}(B1)$, $E_{P2}(B2)$, ..., $E_{Pn}(Bn)$ on the basis of the public key list L to view the data D. On the contrary, in the secret information management apparatus 10T according to the present embodiment, the key management device 40 stores the public key list L and the encrypted data management device 50 stores the encrypted data $E_K(D)$, etc. Thus, the confidentiality of the data D can be enhanced because the encrypted data $E_K(D)$ cannot be decrypted unless the information stored in both the key management device 40 and the encrypted data management device 50 is gathered.

Fourth Embodiment

Figure 18:
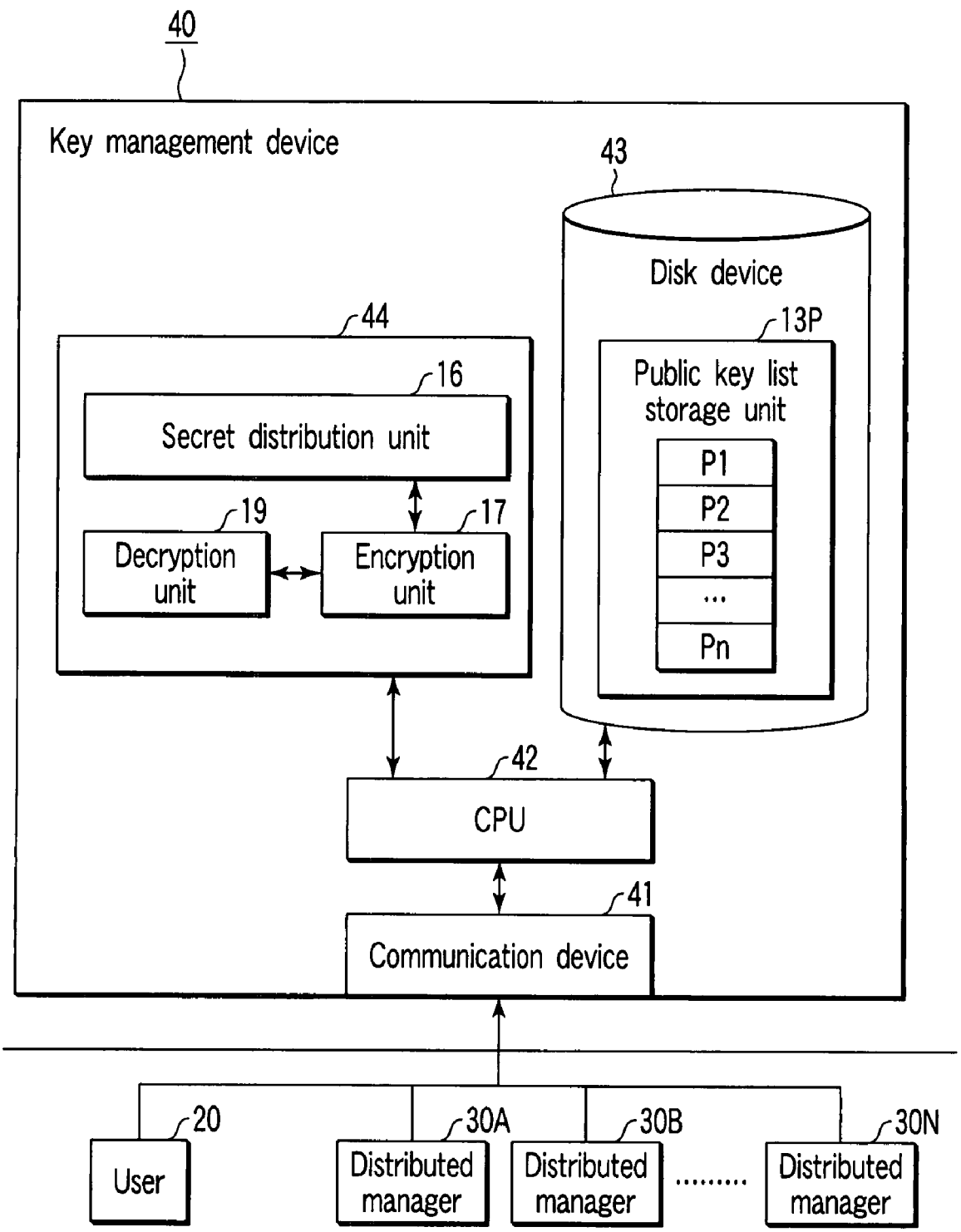
FIG. 18 is a schematic diagram showing the configuration of a secret information management system according to a fourth embodiment of the present invention.

FIG. 18 is a schematic diagram showing the configuration of a secret information management system according to a fourth embodiment of the present invention.

The present embodiment is different from the third embodiment, so that the encrypted data management device 50 is omitted, and a key management device 40 has a function of returning encrypted data key Epx(K) and n encrypted distributed keys $E_{P1}(B1)$, $E_{P2}(B2)$, ..., $E_{Pn}(Bn)$ that have been created to a user terminal 20. In the user terminal 20, when the encrypted data key Epx(K) and the n encrypted distributed keys $E_{P1}(B1)$, $E_{P2}(B2)$, ..., $E_{Pn}(Bn)$ are returned, they are stored in a storage unit 21 in association with the encrypted data $E_K(D)$.

Figure 19:
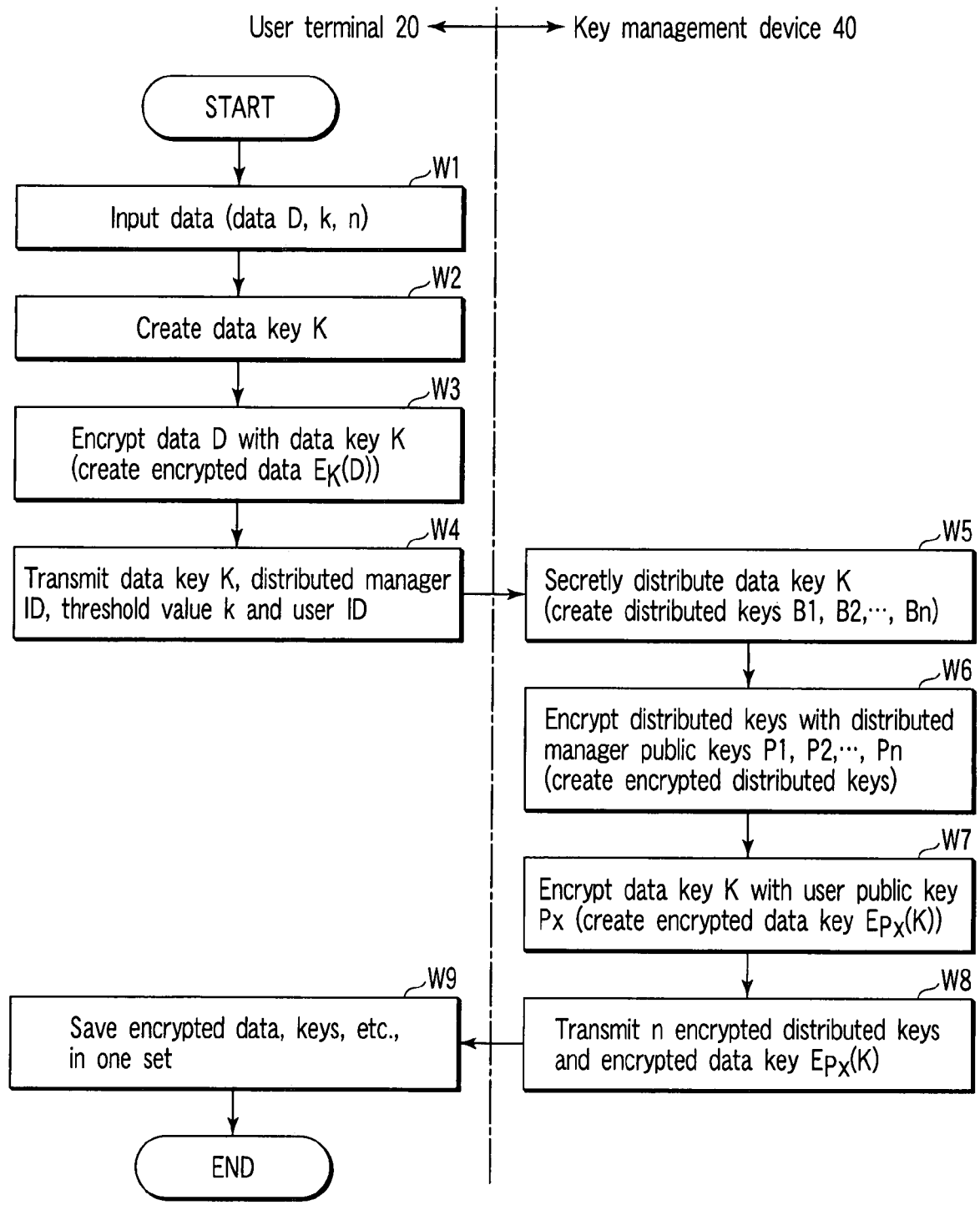
FIG. 19 is a flowchart for explaining the operation of encryption according to the fourth embodiment of the present invention.

Next, the operation of data encryption by the secret information management system according to the present embodiment is explained with reference to a flowchart in FIG. 19 and a conceptual diagram of a data flow in FIG. 20.

To start with, the user terminal 20 executes the same processes W1 to W4 as the processes V1 to V4 described above, and transmits information on a data key K, distributed manager IDs (for n persons), a threshold value k and a user ID to the key management device 40 (W4).

In the key management device 40, the received data key K, distributed manager IDs, threshold value k and user ID are stored in a memory 44, and a distributed manager ID list which includes the user ID, a data name "data", the distributed manager IDs and the threshold value k in association with each other is stored in a public key list storage unit 13P.

Then, in the key management device 40, the same processes W5 to W7 as the processes V6 to V8 described above are executed, thereby creating n encrypted distributed keys $E_{P1}(B1)$, $E_{P2}(B2)$, ..., $E_{Pn}(Bn)$ (W6) and also creating the encrypted data key Epx(K) (W7).

Subsequently, the key management device 40 returns the encrypted distributed keys $E_{P1}(B1)$, $E_{P2}(B2)$, ..., $E_{Pn}(Bn)$ and the encrypted data key Epx(K) to the user terminal 20 which is the transmission source of the data key K (W8).

In the user terminal 20, when the encrypted distributed keys $E_{P1}(B1)$, $E_{P2}(B2)$, ..., $E_{Pn}(Bn)$ and the encrypted data key Epx(K) are received, they are stored in the storage unit 21 in association with the encrypted data $E_K(D)$ (W9).

In addition, the operation of decrypting the encrypted data $E_K(D)$ is performed in the same manner as in the first embodiment. However, the key management device 40 having a decryption unit 19 mainly performs the decryption operation, and the decryption unit 19 reads the encrypted data key and the encrypted distributed keys from the user terminal 20.

As described above, according to the secret information management system in the present embodiment, the user terminal 20 stores the encrypted distributed keys $E_{P1}(B1)$, $E_{P2}(B2)$, ..., $E_{Pn}(Bn)$ created by the key management device 40, the encrypted data $E_K(D)$ can be decrypted, if threshold value k or more distributed keys are collected to reconstruct the data key K. Even when a user secret key Sx is lost.

Furthermore, when the secret information management system according to the present embodiment is used, the encrypted data is stored in the user terminal 20 such that it is possible to construct a system which prevents data from being viewed even when another person uses the user terminal 20 and which can decrypt the encrypted data $E_K(D)$ even when the user secret key Sx is lost.

In addition, the decryption operation is mainly performed not exclusively by the key management device 40, and every possibility can be conceived. For example, a modification can be made so that a program for causing a computer to achieve the function of the decryption unit 19 is installed in the user terminal 20 or the distributed manager terminal 30 in order to allow the user terminal 20 or the distributed manager terminal 30 to perform the decryption operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A secret information management apparatus based on a (k, n) threshold secret sharing scheme having a threshold value k and a share number n, the apparatus comprising:
- a data receiving device which receives data, distributed manager IDs for the share number n, the threshold value k and a user ID;
- a public key list storage device which stores a public key list, the public key list including n or more sets of distributed manager IDs, distributed manager public keys and distributed manager address information and also including the user ID and a user public key corresponding to the user ID;
- a data key creation unit which creates a data key using random numbers;
- an encrypted data outputting unit which encrypts the data using the data key and outputs encrypted data;
- an encrypted data key creation unit which searches the public key list storage device for the user public key corresponding to the received user ID, encrypts the data key using the user public key, and outputs an encrypted data key;
- a distributed key creation unit which distributes the data key created by the data key creation unit using the (k, n) threshold secret sharing scheme to create n distributed keys;
- an encrypted distributed key creation unit which reads, from the public key list storage device, distributed manager public keys corresponding to n distributed manager IDs received by the data receiving device, encrypts the n distributed keys using the respective distributed manager public keys, and outputs n encrypted distributed keys;
- an encrypted data storage unit which stores the encrypted data, the encrypted data key and the n encrypted distributed keys;
- a decryption method judging unit which judges whether decryption method information is first decryption method information or second decryption method information when a request to decrypt the encrypted data is received together with the decryption method information;
- an encrypted data key transmission unit which transmits the encrypted data key to a transmission source of the decryption method information with a request to decrypt the encrypted data key when the decryption method information is the first decryption method information;
- a first decryption unit which decrypts the encrypted data using the data key decrypted by a user secret key corresponding to the user public key to obtain the data in response to the request to decrypt the encrypted data key when receiving the data key from the transmission source of the decryption method information;
- an encrypted distributed key transmission unit which transmits the n encrypted distributed keys in the encrypted data storage unit to the respective distributed manager address information in the public key list when the decryption method information is the second decryption method information;
- a data key restore unit which restores the data key using the (k, n) threshold secret sharing scheme when the encrypted distributed keys are individually decrypted by distributed manager secret keys at transmission destinations of the encrypted distributed keys and the distributed keys are received from k transmission destinations; and
- a second decryption unit which decrypts the encrypted data using the data key to obtain the data.

2. A secret information management system, comprising:
a user terminal to input data; and
a secret information management apparatus using a (k, n) threshold secret sharing scheme having a threshold value k and a share number n to store encrypted data obtained by encrypting the data,
the secret information management apparatus comprising:
- a data receiving unit which receives the data, distributed manager IDs for the share number n, the threshold value k and a user ID;
- a public key list storage unit which stores a public key list, the public key list including n or more sets of distributed manager IDs, distributed manager public keys and distributed manager address information and also including the user ID and a user public key corresponding to the user ID;
- a data key creation unit which creates a data key using random numbers;
- an encrypted data outputting unit which encrypts the data using the data key and outputs encrypted data;
- an encrypted data key creation unit which searches the public key list storage unit for the user public key corresponding to the received user ID, encrypts the data key using the user public key, and outputs an encrypted data key;
- a distributed key creation unit which secretly distributes the data key created by the data key creation unit using the (k, n) threshold secret sharing scheme to create n distributed keys;
- an encrypted distributed key creation unit which reads, from the public key list storage unit, distributed manager public keys corresponding to n distributed manager IDs received by the data receiving unit, encrypts the n distributed keys using the respective distributed manager public keys, and outputs n encrypted distributed keys;
- an encrypted data storage unit which stores the encrypted data, the encrypted data key and the n encrypted distributed keys;
- a decryption method judging unit which judges whether decryption method information is first decryption method information or second decryption method information when a request to decrypt the encrypted data is received together with the decryption method information from the user terminal;
- an encrypted data key transmission unit which transmits the encrypted data key to the user terminal with a request to decrypt the encrypted data key when the decryption method information is the first decryption method information;
- a data key receiving unit which receives data keys decrypted by a user secret key corresponding to the user public key from the user terminal in response to the request to decrypt the encrypted data;
- a first decryption unit which decrypts the encrypted data using the data key received by the data key receiving unit to obtain the data;
- an encrypted distributed key transmission unit which transmits the n encrypted distributed keys in the encrypted data storage unit to the respective distributed manager address information included in the public key list when the decryption method information is the second decryption method information;

a data key restore unit which restores the data key using the (k, n) threshold secret sharing scheme when the encrypted distributed keys are individually decrypted by distributed manager secret keys at transmission destinations of the encrypted distributed keys and the distributed keys are received from k transmission destinations; and a second decryption unit which decrypts the encrypted data using the data key to obtain the data, the user terminal including:

a data transmission unit which transmits the data, the distributed manager IDs for the share number n, the threshold value k and the user ID to the secret information management apparatus;

a decryption request transmitting unit which transmits the request to decrypt the encrypted data to the secret information management apparatus together with the decryption method information; and a data key transmitting unit which decrypts the encrypted data key by the user secret key and transmits a data key to the secret information management apparatus when receiving the encrypted data key and the request to decrypt the encrypted data from the secret information management apparatus.

3. A secret information management system, comprising:

a user terminal to input data; and a secret information management apparatus using a (k, n) threshold secret sharing scheme having a threshold value k and a share number n to store encrypted data obtained by encrypting the data, the secret information management apparatus comprising:

an encrypted data receiving unit which receives the encrypted data, a data key, distributed manager IDs for the share number n, the threshold value k and a user ID;

a public key list storage unit which stores a public key list, the public key list including n or more sets of distributed manager IDs, distributed manager public keys and distributed manager address information and also including the user ID and a user public key corresponding to the user ID;

an encrypted data key creation unit which searches the public key list storage unit for the user public key corresponding to the received user ID, encrypts the data key using the user public key, and outputs an encrypted data key;

a distributed key creation unit which secretly distributes the data key created by the data key creation unit using the (k, n) threshold secret sharing scheme and creates n distributed keys;

an encrypted distributed key creation unit which reads, from the public key list storage unit, distributed manager public keys associated with n distributed manager IDs received by the encrypted data receiving unit, individually encrypts the n distributed keys using the n distributed manager public keys, and outputs n encrypted distributed keys; and an encrypted data storage unit which stores the encrypted data, the encrypted data key and the n encrypted distributed keys;

the user terminal including:

a unit to input the data, the distributed manager IDs for the share number n, the threshold value k and the user ID;

a data key creation unit which creates a data key using random numbers;

an encrypted data outputting unit which encrypts the data using the data key and outputs encrypted data; and an encrypted data transmission unit which transmits the encrypted data, the data key, the distributed manager IDs for the number n and the threshold value k to the secret information management apparatus.

4. The secret information management system according to claim 3, wherein the secret information management apparatus further comprises:

a key management device having the encrypted data receiving unit, the public key list storage unit, the encrypted data key creation unit, the distributed key creation unit and the encrypted distributed key creation unit; and an encrypted data management device having the encrypted data storage unit.

5. The secret information management system according to claim 4, wherein the key management device further comprises:

a unit which transmits the encrypted data key and the n encrypted distributed keys to the user terminal, and the user terminal further comprises:

a unit which stores the encrypted data, the encrypted data key and the n encrypted distributed keys in association with each other.

6. A secret information management apparatus based on a (k, n) threshold secret sharing scheme having a threshold value k and a share number n, the apparatus comprising:

a data receiving device which receives data and a user ID;

a public key list storage device which stores a public key list in association with the threshold value k, the public key list including n sets of distributed manager IDs, distributed manager public keys and distributed manager address information and also including the user ID and a user public key corresponding to the user ID;

a data key creation unit which creates a data key using random numbers;

an encrypted data outputting unit which encrypts the data using the data key and outputs encrypted data;

a distributed key creation unit which secretly distributes the data key created by the data key creation unit using the (k, n) threshold secret sharing scheme to create n distributed keys;

an encrypted distributed key creation unit which reads n distributed manager public keys in the public key list from the received user ID, encrypts the n distributed keys using the respective distributed manager public keys, and outputs n encrypted distributed keys;

an encrypted data storage unit which stores the encrypted data and the n encrypted distributed keys;

an encrypted distributed key transmission unit which transmits n encrypted distributed keys in the encrypted data storage unit to the respective distributed manager addresses information included in the public key list when a request to decrypt the encrypted data is received;

a data key restore unit which restores the data key using the (k, n) threshold secret sharing scheme when the encrypted distributed keys are individually decrypted by distributed manager secret keys at transmission destinations of the encrypted distributed keys and the distributed keys are received from k transmission destinations; and a decryption unit which decrypts the encrypted data using the data key to obtain the data.

* * * * *